(12) United States Patent
Lukehart et al.

(10) Patent No.: US 8,048,940 B2
(45) Date of Patent: *Nov. 1, 2011

(54) REACTIVE GRAPHITIC CARBON NANOFIBER REINFORCED POLYMERIC COMPOSITES SHOWING ENHANCED FLEXURAL STRENGTH

(75) Inventors: Charles M. Lukehart, Nashville, TN (US); Wei Hong Zhong, Fargo, ND (US); Jiang Li, Nashville, TN (US); Eric D. Mowles, Panama City, FL (US)

(73) Assignee: Vanderbilt University, Nashville, TN (US)

( * ) Notice: Subject to any disclaimer, the term of this patent is extended or adjusted under 35 U.S.C. 154(b) by 1164 days.

This patent is subject to a terminal disclaimer.

(21) Appl. No.: 11/177,481

(22) Filed: Jul. 11, 2005

(65) Prior Publication Data
US 2006/0217482 A1  Sep. 28, 2006

Related U.S. Application Data

(60) Provisional application No. 60/586,688, filed on Jul. 9, 2004.

(51) Int. Cl.
*C08K 9/04* (2006.01)
*C08K 3/04* (2006.01)
(52) U.S. Cl. ........................ 523/215; 524/495
(58) Field of Classification Search .................. 523/215; 524/495
See application file for complete search history.

(56) References Cited

U.S. PATENT DOCUMENTS

| | | | |
|---|---|---|---|
| 4,855,091 A | 8/1989 | Geus | |
| 6,537,515 B1 | 3/2003 | Baker | |
| 7,125,533 B2 * | 10/2006 | Khabashesku et al. | 423/447.1 |
| 2002/0054849 A1 | 5/2002 | Baker | |
| 2003/0232452 A1 | 12/2003 | Seeberger | |
| 2004/0039201 A1 | 2/2004 | Lugade | |
| 2004/0202603 A1 * | 10/2004 | Fischer et al. | 423/447.2 |
| 2007/0298669 A1 * | 12/2007 | Barrera et al. | 442/198 |
| 2008/0257015 A1 * | 10/2008 | Lukehart et al. | 73/31.05 |

FOREIGN PATENT DOCUMENTS

| | | |
|---|---|---|
| WO | WO 97 32571 | 9/1997 |
| WO | WO 02/09766 A1 | 2/2002 |

OTHER PUBLICATIONS

Zhong et al, "Graphitic Carbon Nanofiber (GCNF)/Polymer Materials. II. GCNF/Epoxy Monoliths Using Reactive Oxydianiline Linker Molecules and the Effect of Nanofiber Reinforcement on Curing Conditions," Polymer Composites, vol. 26, pp. 128-135, first published online on Jan. 13, 2005.*

Zhong et al, "Graphitic Carbon Nanofiber (GCNF)/Polymer Materials. I. GCNF/Epoxy Monoliths Using Hexanediamine Linker Molecules," Journal of Nanoscience and Nanotechnology, vol. 4, pp. 794-802, 2004.*

* cited by examiner

*Primary Examiner* — Vickey Nerangis
(74) *Attorney, Agent, or Firm* — John Bruckner PC

(57) ABSTRACT

Composites comprising at least one graphite-carbon nanofiber (GCNF) and a polymer phase covalently linked to a surface thereof.

21 Claims, 13 Drawing Sheets

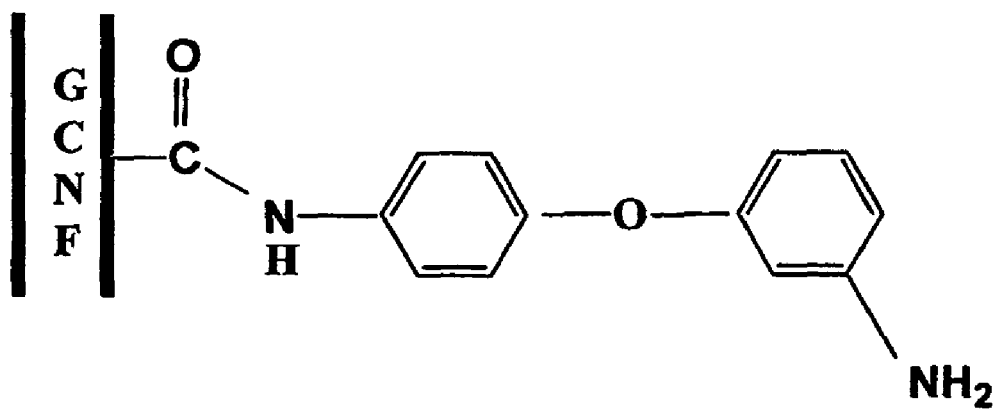
Fig.1. Structural drawing of one isomer of a GCNF-ODA nanofiber.

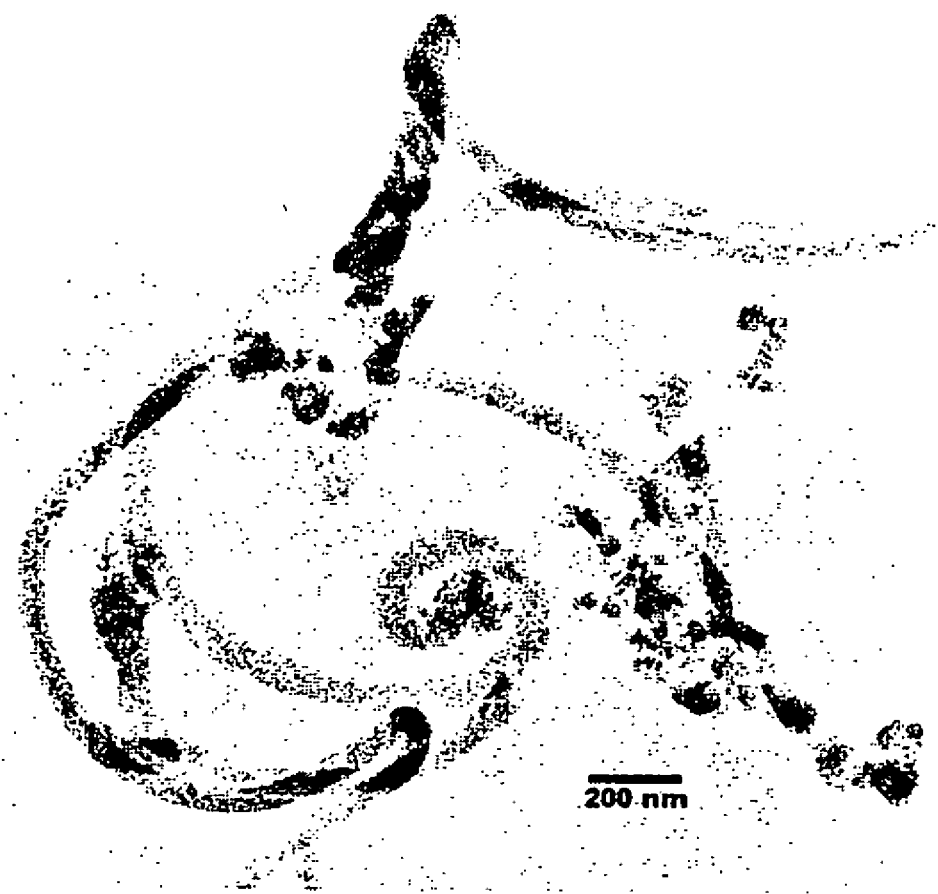
*Fig. 2. TEM image of as-derivatized GCNF-ODA nanofibers.*

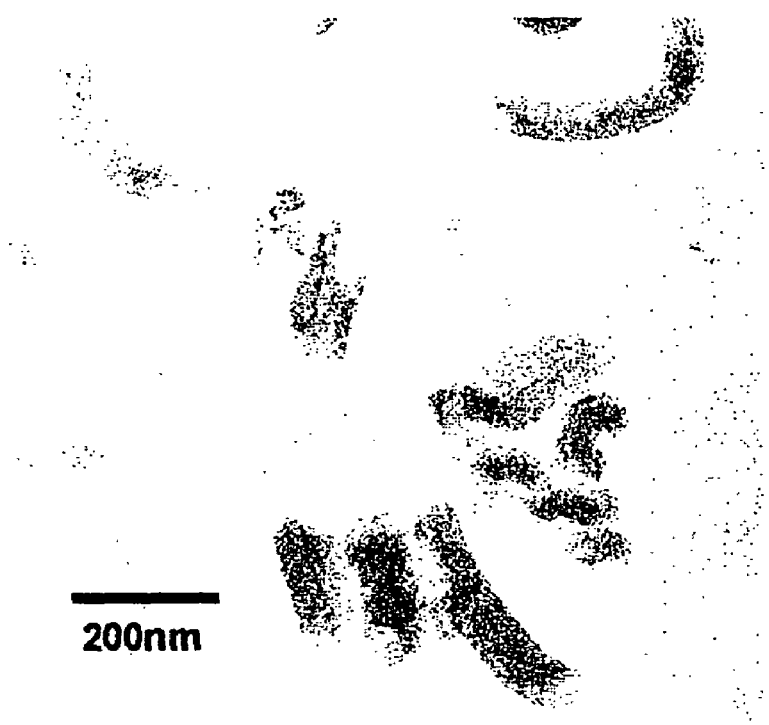
Fig. 3. TEM image of r-GCNF-ODA nanofibers from diluent blend.

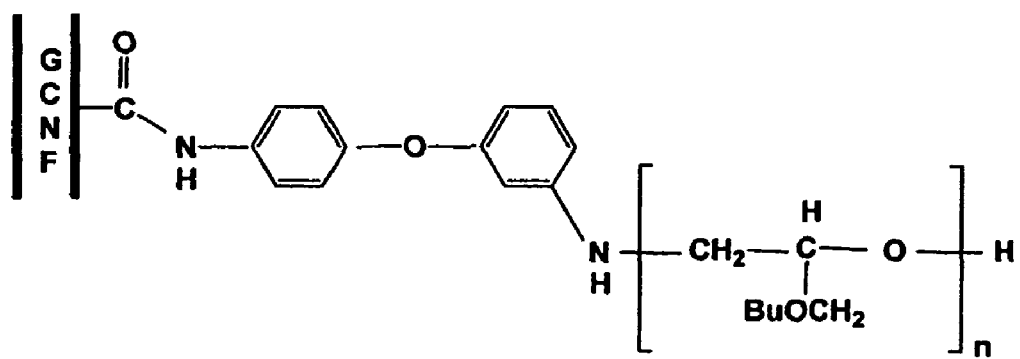
Fig. 4 Structural drawing of one isomer of a r-GCNF-ODA nanofiber.

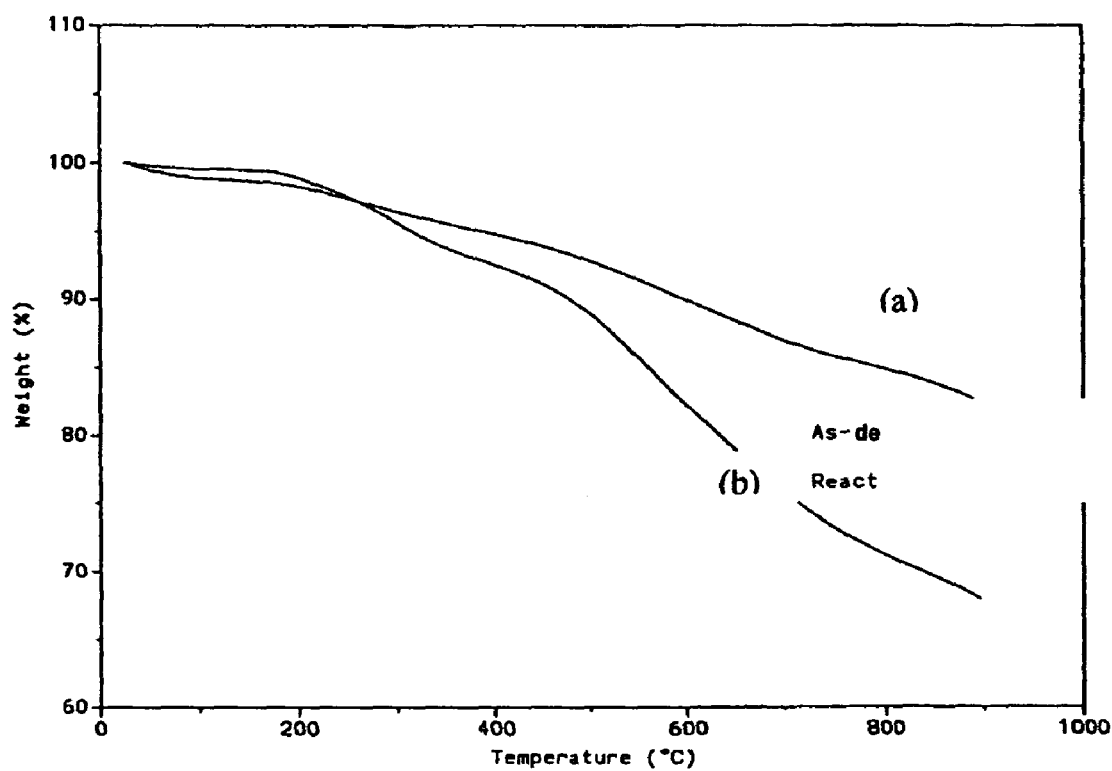
Fig. 5. TGA curves of as-derivatized GCNF-ODA (a) and r-GCNF-ODA (b) nanofibers.

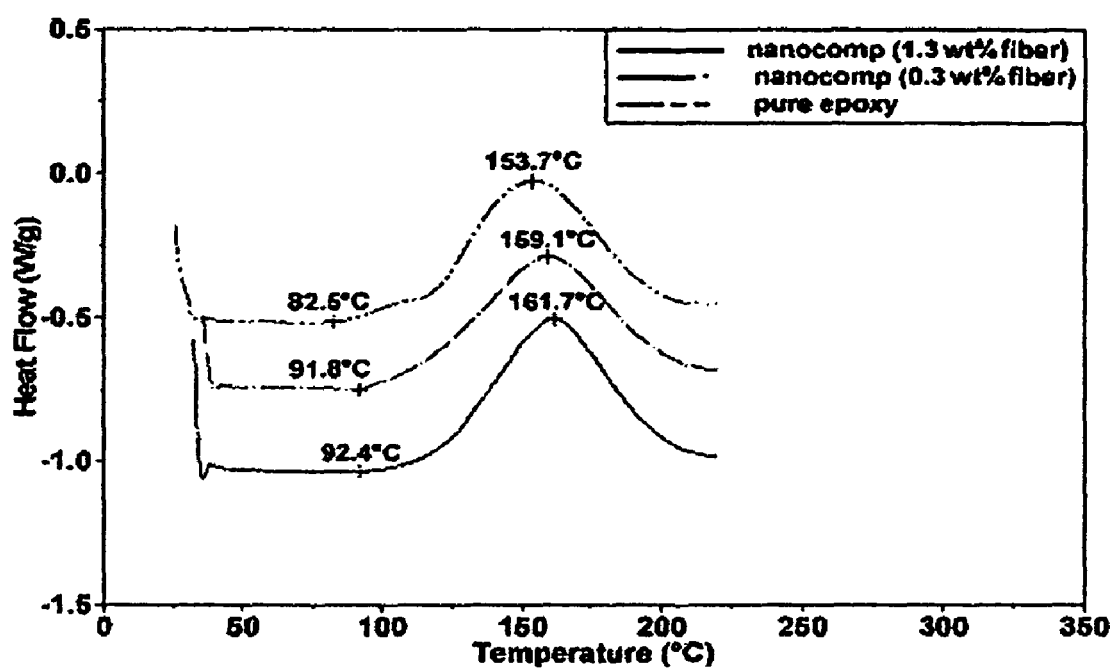
Fig. 6. DSC curves for uncured blends of 826 epoxy, curing agent and reactive nanofibers.

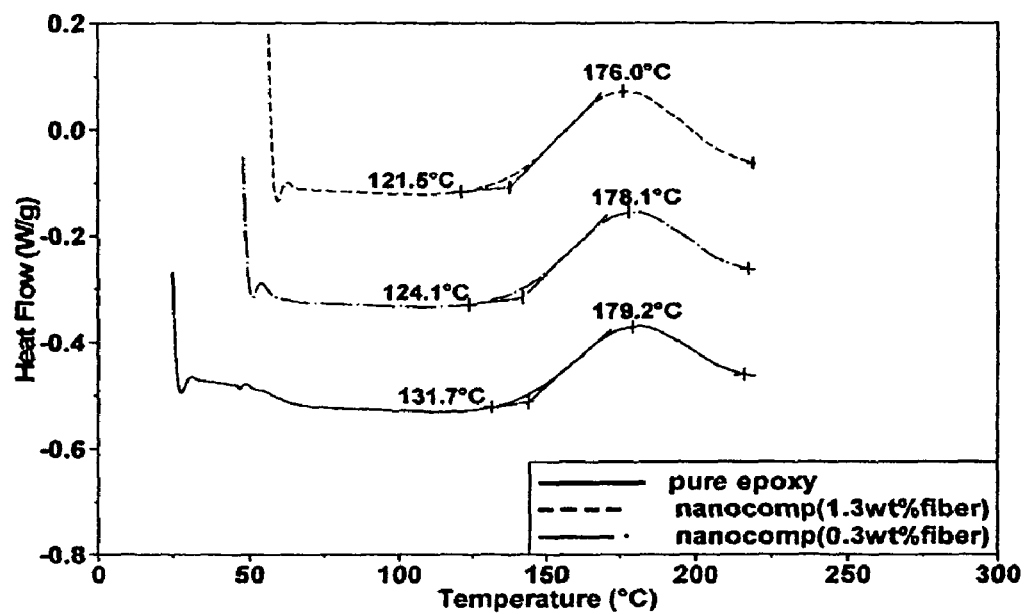
Fig. 7. DSC curves of cured nanocomposites of 826 epoxy, curing agent and reactive nanofibers.

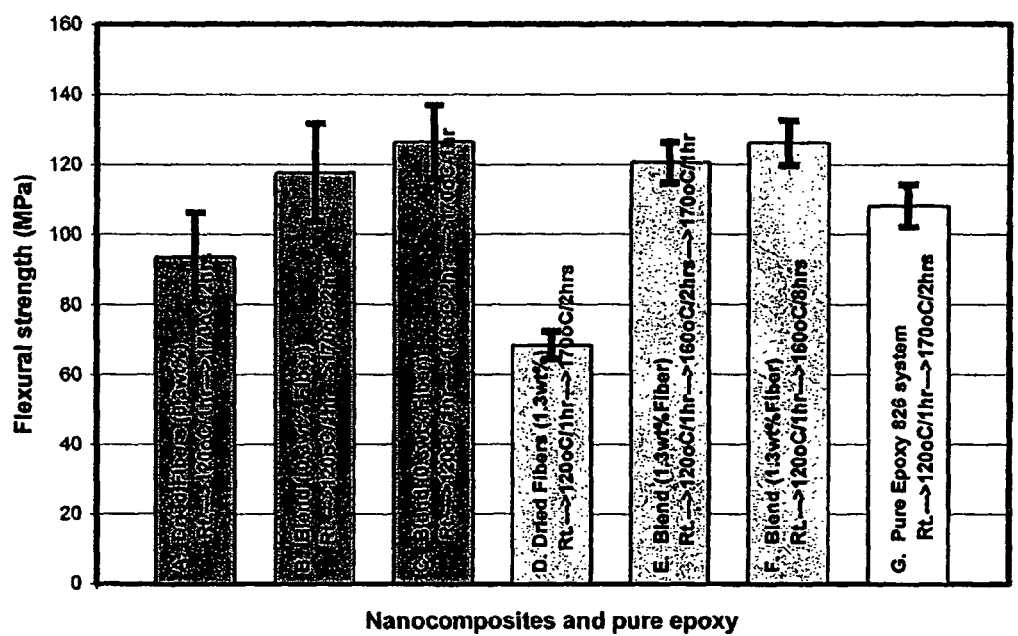
Fig. 8. Flexural strengths of pure epoxy and r-GCNF-ODA/epoxy nanocomposite specimens.

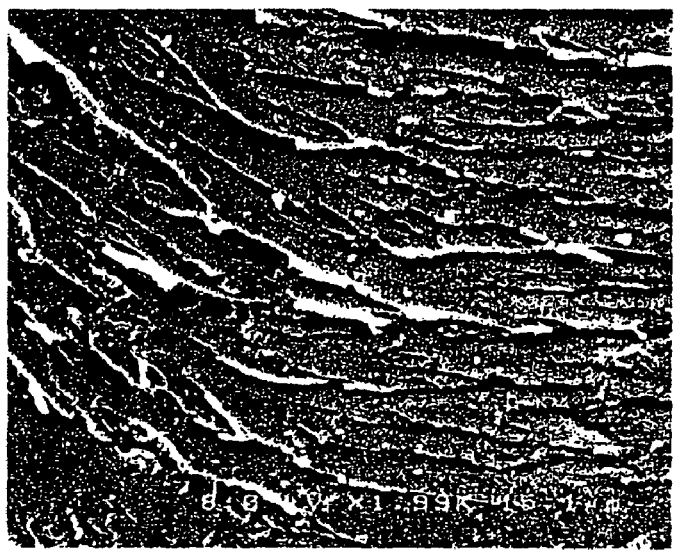
Fig.9. SEM image of r-GCNF-ODA/epoxy nanocomposite prepared using pre-dried nanofibers.

Fig.10. SEM image of r-GCNF-ODA/epoxy nanocomposite prepared using a nanofiber/diluent blend.

| Materials | | $T_i$ (°C) | $T_p$ (°C) | Curing Degree $\alpha$ (%) |
|---|---|---|---|---|
| 826 Epoxy System | Pure epoxy | 131.7 | 179.2 | 80.2 |
| | Nanocomposite with 0.3 wt% fiber | 124.1 | 178.1 | 76.1 |
| | Nanocomposite with 1.3 wt% fiber | 121.5 | 176.0 | 70.3 |
| 828 Epoxy System | Pure epoxy | 133.1 | 184.5 | 84.5 |
| | Nanocomposite with 0.3 wt% fiber | 125.9 | 181.4 | 78.8 |
| | Nanocomposite with 1.3 wt% fiber | 124.1 | 179.3 | 74.6 |

Fig. 11. Characteristic Curing Temperatures and Degree of Curing of Pure Epoxy Resin Systems and Nanocomposites with Reactive GCNF-ODA Nanofibers

| | Nanofiber content (wt%) | Flexural strength (MPa) | Sta.Dev (MPa) | Sta.Dev/ strength % | Increase compared to Epoxy (%) |
|---|---|---|---|---|---|
| Epoxy | 0 | 113.0 | 8.92 | 7.9 | |
| Nanocomposite- 008 | 0.08 | 107.9 | 6.50 | 6.0 | -4.5 |
| Nanocomposite- 015 | 0.15 | 124.3 | 16.82 | 13.5 | 10.0 |
| Nanocomposite- 020 | 0.20 | 148.2 | 7.62 | 5.1 | 31.1 |
| Nanocomposite- 030 | 0.30 | 154.7 | 1.33 | 0.9 | 36.9 |

Scheme 1. Surface oxidation, acylation, and functionalization of graphitic carbon nanofibers (see Experimental section for reaction conditions).

REACTIVE GRAPHITIC CARBON NANOFIBER REINFORCED POLYMERIC COMPOSITES SHOWING ENHANCED FLEXURAL STRENGTH

CROSS-REFERENCE TO RELATED APPLICATIONS

This application claims priority based on Provisional Application Ser. No. 60/586,688 filed Jul. 9, 2004.

FIELD OF THE INVENTION

The present invention relates to covalently bonded GCNF-polymer composites.

BACKGROUND OF THE INVENTION

Carbon fibers are widely used as reinforcement for advanced polymeric matrix composites in many high-technology applications because of their high specific stiffness, strength, and excellent electrical and thermal properties. Carbon fibers have many forms, depending on the synthesis methods used. Conventional carbon fibers such as those obtained by pyrolyzing polyacrylonitrile (PAN) resins or other precursors are typically several microns in width and have high aspect ratios. The discovery of carbon nanotubes, single-walled or multi-walled carbon nanotubes (SWNTs or MWNTs), has led to the fabrication of various kinds of nanocomposites. Graphitic carbon nanofibers (GCNFs) are also attractive additives for fabricating carbon fiber/polymer composite materials of enhanced strength and electrical conductivity due to their unusual atomic structure.

The unique properties of graphitic carbon nanofibers have generated intense interest in the application of these new carbon materials in a number of applications, including polymer reinforcement. The preparation and characterization of GCNFs has been well studied and such fibers are now available commercially. Three types of GCNFs, "platelet" (perpendicular), "ribbon" (parallel) and "herringbone" structures, are grown via catalytic decomposition of hydrocarbons or carbon monoxide over metal nanoparticle growth catalysts. The width of the nanofibers produced is controlled by the size of the catalyst particle responsible for their growth and can vary between 5 nm and hundreds of nanometers, with lengths ranging from 5-10 microns. Several carbon nanofiber/organic polymer nanocomposites are known. For example, 5 wt % carbon nanofiber/polypropylene composites exhibit tensile strength and modulus enhancements of 20% and 50%, respectively. Carbon nanofiber reinforced poly (ether ketone) composites are also known, and evaluation of the mechanical properties of such composites reveals a linear increase in tensile stiffness and strength, with nanofiber loading up to 15 wt %. Those studies show that efficient wetting and high dispersion of carbon nanofibers within a polymer matrix continues to be problematic.

Chemical modification of carbon fiber surfaces can be used to enhance attractive interactions at the fiber/polymer interface. Surface-derivatization of conventional carbon fibers with hydroxyl, ketone, carboxyl or amino groups leads to significant improvement in fiber wettability and fiber-matrix adhesion, resulting in increased interlaminar shear strength and flexural strength. With nanoscale carbon fibers now available, it is possible to control fiber/matrix interactions at nearly the atomic level.

Obtaining uniform dispersions of nanofiber reinforcement within a polymer-matrix is another critical issue in nanocomposite processing. The degree to which nanofiber additives can be homogeneously dispersed in a matrix strongly influences the degree of property enhancement of the resulting composite. Nanoscale particles tend to aggregate due to their high surface areas, high aspect ratios, and a thermodynamic driving force to maximize fiber-fiber electrostatic and van der Waals interactive forces. Nanofiber agglomeration inhibits their uniform dispersion in composite materials and prevents efficient transfer of nanofiber properties to the composite matrix. Greatly enhanced performance of nanocomposite materials reinforced with nanotube or nanofiber additives has not been fully achieved because of difficulties in achieving efficient dispersion and wetting of the nanoscale component within the matrix material, even when using surface-functionalized additives.

While GCNFs have atomic structures amenable to high-density surface-derivatization, full realization of this advantage critically depends on achieving complete dispersion of these nanofibers in the matrix. To obtain high-quality nanocomposites with excellent properties, a technique of uniformly dispersing functionalized GCNFs during processing is required. Known methods for dispersing nanoparticles aggregates include; (1) mechanical agitation such as stirring, (2) use of dispersing agents, and, (3) ultrasonic vibration. Ultrasonication has also been used to disperse sub-micrometer powders that are difficult to disperse by other methods.

Fiber-matrix interfacial adhesion can play an important role in determining the mechanical properties of carbon fiber/polymer composites. Stronger interfacial bonding generally imparts better mechanical properties. Surface modification of carbon fibers can improve bonding between the fiber surface and polymer resin components.

For conventional carbon/graphite fibers, as mentioned above, it is known that surface derivatization, as well variety of surface coating and modification techniques, can be used to enhance interfacial bonding between carbon fiber additives and polymer matrices. Factors that can be significant in promoting adhesion in such materials include, for example: 1) removal of any weak boundary layers; 2) introduction of variable surface topography to enhance mechanical interlocking; 3) improved fiber wettability; and, 4) creation or addition of chemical functional groups on fiber surfaces. Surface-derivatization of conventional carbon fibers with hydroxyl, carboxyl, or amino groups can result in significant improvement in fiber wettability and fiber-matrix adhesion resulting in greater interlaminar shear and flexural strength. Surface derivatization has not previously been reported for carbon nanofibers having reactive surface carbons.

It is an object of the present invention to provide surface-functionalized and surface-derivatized graphite carbon nanofibers (GCNF).

It is a further object of the present invention to provide methods for producing surface-functionalized and surface-derivatized GCNF.

It is still a further object of the invention to provide GCNF-reinforced polymer/resin composites utilizing the above derivatized GCNF.

It is another object of the invention to provide a method of forming the above composites.

Still another object of the invention is to provide articles of manufacture comprising either the above surface-functionalized GCNF, surface-derivatized GCNF or the composites formed therefrom.

SUMMARY OF THE INVENTION

The present invention relates to covalently bonded GCNF-polymer composites and methods of making the same.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1. is a structural drawing of one isomer of a GCNF-ODA(3,4'oxydianiline) nanofiber.

FIG. 2. is a TEM image of as-derivatized GCNF-ODA nanofibers.

FIG. 3. is a TEM image of a-GCNF-ODA nanofibers from diluent blend.

FIG. 4. is a structural drawing of one isomer of r-GCNF-ODA nanofiber.

FIG. 5. is the TGA curves of as-derivatized GCNF-ODA (a) and r-GCNF-ODA (b) nanofibers.

FIG. 6. is the DSC curves for uncured blends of 826 epoxy, curing agent and reactive nanofibers.

FIG. 7. is the DSC curves of cured nanocomposites of 826 epoxy, curing agent and reactive nanofibers.

FIG. 8. is the Flexural strengths of pure epoxy and r-GCNF-ODA/epoxy nanocomposite specimens.

FIG. 9. is a SEM image of r-GCNF-ODA/epoxy nanocomposite prepared using pre-dried nanofibers.

FIG. 10. is a SEM image of r-GCNF-ODA/epoxy nanocomposite prepared using a nanofiber/diluent blend.

FIG. 11. is a Table of Characteristic Curing Temperatures and Degree of Curing of Pure Epoxy Resin Systems and Nanocomposites with Reactive GCNF-ODA Nanofibers.

DETAILED DESCRIPTION OF THE INVENTION

Figure 12:
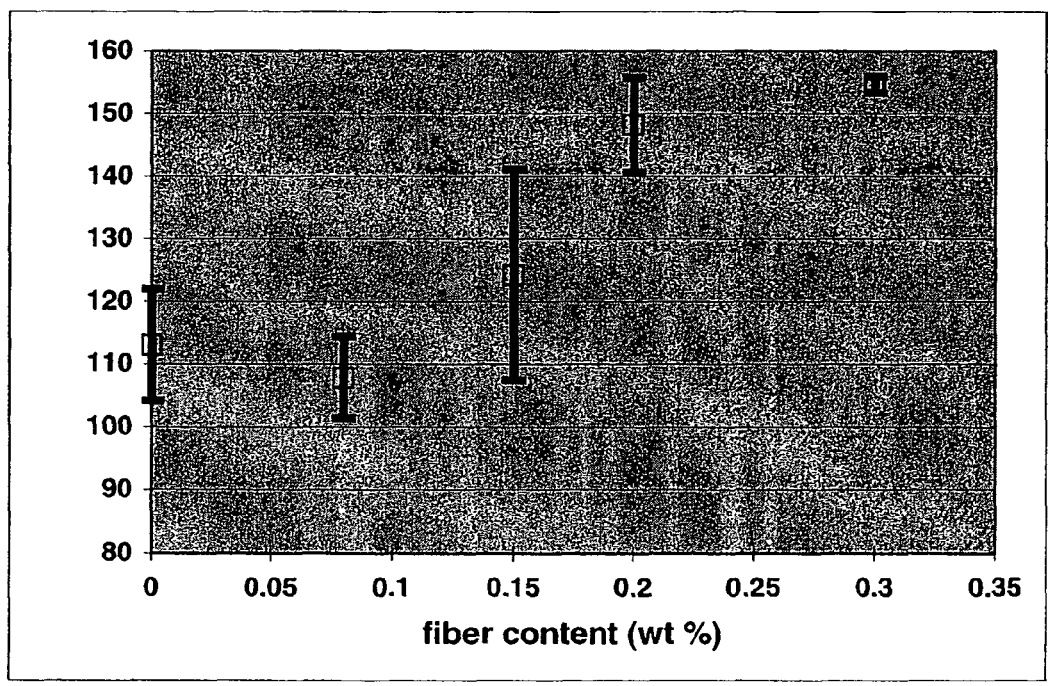
FIG. 12 is a graphic representation of the comparative flexural strengths of the compositions of the invention.

The present invention is predicated on the discovery that covalent binding of bifunctional linker molecules to both the GCNF surface and the polymer resin affords a carbon nanofiber-polymer/resin composite material rather than a simple blend.

The present invention may be understood more readily by reference to the following detailed description of preferred embodiments of the invention and the Examples included therein and to the Figures and their previous and following description.

Before the present compounds, compositions and methods are disclosed and described, it is to be understood that this invention is not limited to specific synthetic methods, and as such may, of course, vary. It is also to be understood that the terminology used herein is for the purpose of describing particular aspects only and is not intended to be limiting.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance mayor may not occur, and that the description includes instances where said event or circumstance occurs and instances where it does not. For example, the phrase "optionally substituted lower alkyl" means that the lower alkyl group mayor may not be substituted and that the description includes both unsubstituted lower alkyl and lower alkyl where there is substitution.

"GCNF" means a graphitic carbon nanofiber.

"Functionalized GCNF" means a GCNF that has been surface modified to make it suitable for derivatization, that is, to provide a derivatized GCNF after reaction of the functionalized GCNF with a suitable linker molecule.

"Derivatized GCNF" means a GCNF that has been modified by covalent bonding of a linker molecule to the surface thereof. As used herein, the GCNF is derivatized by reacting a functionalized GCNF with a suitable linker molecule.

"Reactive, derivatized GCNF" means GCNF derivatized with a linker molecule in which the linker molecule has suitable chemical reactivity to react covalently with polymer monomers or oligomers to provide extended linker molecule structures capable of binding covalently with further additional monomers, oligomers or polymer resin to provide the GCNG polymer hybrid materials of the present invention.

"Linker molecule" means a molecular structure that is suitable for covalently attaching a GCNF to a polymer phase. The linker molecule may be a single molecule of suitable length and/or rigidity as described elsewhere herein. The linker molecule may also comprise more than one molecule joined together, where the joined-together molecules have a length and/or rigidity suitable to covalently attach GCNF to a polymer phase. Whether a single molecule or a group of joined molecules, polymer brushes, linker molecules according to the present invention have a terminal group that is suitable for reaction with a monomer so as to result in a covalent attachment of the GCNF to a polymer phase.

In one aspect, the present invention relates composite materials comprising a carbon nanofibers and polymer resin, wherein the polymer resin is covalently attached to the GCNF by way of a linker molecule. The invention does not include single walled or multi-walled carbon nanotubes.

GCNFs have unusual atomic structure and are thus believed by the inventors herein to present attractive properties that make them useful in the preparation of GCNF-polymer composite materials. GCNFs are generally formed in tube-furnace reactions using metal or binary metal alloy growth catalysts and either ethylene or CO as a carbon source. Depending on the metal catalyst and thermal profile used for synthesis of the GCNFs, these materials can be prepared having widths ranging from about 5 to about 1000 nm and having lengths ranging from about 5 to about 10 microns. In further aspects, GCNFs can be prepared under growth conditions suitable to provide graphene planes comprising the nanofibers oriented either parallel, perpendicular or in a herringbone pattern relative to the long axis of the carbon nanofiber.

Within any GCNF the interplatelet spacing of 0.335 nm is the same interplanar spacing present in crystalline graphite. Each GCNF atomic structure provides a reactive surface and an atomic spatial arrangement to an external phase, such as the polymer phase described herein.

The inventors herein have found that the properties of GCNFs, but not carbon nanotubes, provide an excellent medium to promote covalent bonding between the GCNF and a polymer to provide a GCNF-polymer composite material of a type not previously available.

One type of GCNF suitable for use in the present invention is herringbone-type carbon nanofiber structure. The inventors herein have found that GCNFs having a herringbone configuration possess highly reactive carbon atoms located at the edge sites (which define the herringbone structure) of the nanofiber. When treated according to the techniques disclosed herein, these edge sites have been found to provide a high degree of covalent binding of the GCNF to the polymer phase, thus forming an exemplary composite material. Additionally, the inventors herein have found that GCNF of the perpendicular (or platelet) type also has the appropriate reactive surface carbon atoms and, as such, is suitable for use in the invention herein. Suitable GCNF materials are disclosed in U.S. Pat. Nos. 6,537,515 and 4,855,091, as well as U.S. Patent Application Serial No. US 2002/0054849 A1, the disclosures of which are incorporated herein in their entireties by this reference. Catalytic Materials LLC of Holliston, Mass. is also believed to sell suitable GCNF materials.

Herringbone-type carbon nanofibers are typically grown by the interaction of a carbon source gas with mixed-metal powder growth catalyst, following a known procedure. Iron-copper powder with atomic ratio of 7:3 was prepared by the co-precipitation of the respective metal nitrate solutions with ammonium bicarbonate. The precipitate was dried in an oven at 110° C. and ground into fine powder. This powder was put into a quartz boat in a horizontal tubular furnace and was converted into metal oxides mixture by calcining in air at 400° C. for 4 h. The resulting mixed-metal oxide was reduced in a 20% $H_2$/He flow of 250 mL/min at 500° C. for 20 h. After the growth catalyst was further reduced at 600° C. for 2 h, ethylene was introduced to the reactor with the gas composition of 4:1:1 for $C_2H_4:H_2$:He. The growth of carbon nanofibers was completed at 600° C. after 90 min. The product was cooled to room temperature under helium. The structure of the carbon nanofibers was confirmed by transmission electronic microscopy.

The GCNF-polymer composite materials of the present invention show a significant strength improvement over polymer materials not including the GCNF materials herein. Still further, the GCNF-polymer material has a strength improvement of at least about 5, 10, 15, 20, 25, 30, 35, 40, 45 or greater than about 50% over a polymer material not containing the covalently bound GCNF-polymer materials of the present invention.

Further, such strength improvements are seen even at loadings of functionalized GCNF amounts of as little as about 0.3% weight percent. This degree of strength enhancement is believed to be equal to or better than the strength enhancement seen in prior art composite products having non-covalently bound carbon nanofiber-polymer composites.

In addition to the improvements in strength seen with the composite materials of the present invention, the inventors herein have also seen that the derivatized GCNF fibers used in the present invention exhibit a markedly enhanced wetting behavior in the polymer phase which, in turn, results in increased dispersion of the GCNF in the polymer phase. Also, since structural failure of carbon fiber-polymer composite materials normally occurs at the interface between the materials, it is believed that the GCNF-polymer materials of the present invention can exhibit a lessened propensity for stress failure in use.

The inventors herein have found that surface sites of GCNFs can be derivatized and made reactive using covalently bound linker molecules. When such linker molecules comprise reactive functional groups, it has been found possible to covalently bind the terminus of the linker molecules to a polymer phase. When a suitable number density of reactive linker molecules on the GCNF surface is provided, covalent binding to a polymer phase results in the near elimination of a GCNF polymer interface.

In order to prepare the GCNFs for surface derivatization, for example, an oxidation step can be conducted to functionalize the GCNF surface for derivatization. By "functionalize" it is meant that the normally non-reactive GCNF surface is modified to make it more reactive. The surface may be oxidized, for example, by using strongly acidic materials, such as, nitric acid, hydrochloric acid, sulfuric acid, perchloric acid, and the like. Surface oxidation with acid or other oxidation methods can take place by contacting the GCNFs with a concentrated acid solution for a time sufficient to oxidize a significant portion of the carbon nanofiber surface. Suitable surface preparation methods are disclosed in PCT patent application Ser. No. WO/97 32571, the disclosure of which is incorporated herein by reference in its entirety by this reference.

After surface oxidation (or other type of functionalization), if necessary, the functionalized GCNFs can be washed and dried to ready the surface for derivatization as discussed in more detail below.

For the derivatization step, a linker molecule is attached to the surface of the functionalized GCNF structure. In accordance with the present invention, when attached to the surface of the functionalized GCNF, the linker molecules should be present at a number density sufficient enough to allow covalent bonding of the polymer aspect of the composite to the GCNF. In one aspect, the number density of the linker molecule is at least about 1 for every about 100 GCNF surface carbon atoms. Still further, the number density of the linker molecule is at least about 1 for every about 10 GCNF surface carbon atoms. Still further, the number density of the linker molecule is at least about 1 for every about 5, 10, 20, 30, 40, 50 or 100 GCNF surface carbon atoms, where any of these values can form an endpoint, as appropriate.

In a further aspect, the inventors herein have found that it can be useful to have at least a minimum length for the linker molecule. Without being bound by theory, it is currently believed that in order to obtain a GCNF-polymer composite with enhanced properties over prior art carbon fiber-polymer composite materials (i.e., non-covalently bound carbon fiber-polymer composites), a threshold amount of the monomer in the polymerization reaction should come into contact with the linker molecule. This amount of contact can be enhanced if the linker molecule has a length that allows it to be at least a minimal distance from the surface of the derivatized GCNF.

This minimum distance is believed to minimize or negate any steric restriction to reaction of the monomers caused by the volume of the GCNF structure. The inventors herein currently believe that the minimum length suitable to obtain good contact with the monomer by the reactive terminal end of the linker molecule is an atom terminus-atom terminus length that is at least approximately 5 Å, or at least about 9 Å or at least about 10 Å. While these stated lengths are currently believed to be beneficial for the present invention, it is also believed that the minimum length will be dependent on other factors, such as the size and special aspects of the reactive functionality to be added to the linker molecule.

Moreover, without being bound by theory, it is also believed that it can be beneficial to utilize a linker molecule that is of sufficient rigidity to minimize the possibility that the reactive terminal end of the linker molecule (that is intended to react with a monomer) will not bend back such that it will react with the surface of the derivatized GCNF.

It is known to one of ordinary skill in the art that the degree of rigidity or steric restriction of a molecule can be dependent upon the number of rotatable bonds present in a molecule. Generally, the more cyclic moieties in a molecule, the more rigid (or less flexible) a molecule is. Accordingly, in one aspect, the linker molecule has at least one cyclic group that provides rigidity to the linker molecule. In a further aspect, when more than one molecule is used to form the linker molecule (such as with 3,4'-oxydianiline) (ODA), the group of linker molecules has at least one cyclic group that provides rigidity or steric restriction to the linker molecule. Still further, one or more of the molecules forming a linker molecule can comprise one or more cyclic moieties. As used herein, "rigid" means that the linker molecule cannot bend to a degree that would allow the reactive end of the linker molecule (which is intended to be available for reaction with a monomer) to react with the surface of the functionalized GCNF.

In one aspect, the linker molecules are suitably rigid so as to allow the reactive terminal end of the linker molecules too not readily become attached to the surface of the functionalized GCNF. That is, the linker molecules are suitably rigid such that they do not "fold over" or bend in a manner that would permit the molecules to react with the surface of the functionalized GCNF. For example, when (n) ODA molecules are linked together and the linked molecules are attached to the surface of the a derivatized GCNF to form the linker molecule, the ODA linker molecule (which has two cyclic groups for each individual molecule) is substantially too rigid to allow the linked ODA molecule to fold over and react with the surface of the functionalized GCNF.

Suitable linker molecules for use in the present invention will vary in accordance with the present invention and will vary in accordance with the polymer being prepared, among other things. Linker molecules that are believed to be suitable for use in the invention are disclosed in, for example, U.S. Patent Publication Nos. US 2004/0039201 A1, and US 2003/0232452 A1 and WO 02/09766 AI, the disclosures of which are incorporated herein in their entireties by this reference.

Any linker molecule that has a terminal group that will react with a monomeric moiety to allow covalent bonding with a polymer phase as described herein can be utilized, where one end of the linker molecule has an end that will react with the derivatized GCNF surface. If an individual molecule is not long enough to accomplish this, additional linker molecules can be added, such as, in one example, by adding successive lengths of ODA or polymer monomer. As one, non-limiting, example of the lengthening of the linker molecule, an ODA linker molecule that has been attached to a functionalized GCNF has been found to react with butyl glycidyl ether to form mono-, di-, tri- and tetra-glycidyl oligomers that are covalently coupled to the ODA pendant amino group. The resulting GCNF-ODA(glycidyl)n nanofibers (r-GCNF-ODA) have been found to be especially suitable for reaction with monomeric species, in particular, epoxy monomers.

While the use of ODA has been described specifically, other suitable linker molecules can be used. Such suitable linker molecules will be molecules that have one end that can react with the derivatized GCNF and a terminal end (that is, the end that will react with the monomer) suitable to react a monomeric species to provide a covalently bound GCNF-polymer composite. As would be recognized by one of ordinary skill in the art, the surface of GCNF can be functionalized in a number of manners, each of which would result in a different linker molecule being suitable for attachment. In order to obtain the length suitable to allow ready contact of the reactive moiety of the linker molecule with the monomer, the linker molecule can either itself have the required length or it can be extended as shown with ODA above.

As noted, the covalently bound linker molecule is reacted with a monomer that is present in a polymerization reaction medium or as an additive. As would be recognized by one of ordinary skill in the art, upon reaction with the terminal end of the linker molecule, the polymer derived from a monomeric unit will be covalently bound to the GCNF. The other end of the monomer unit is then available to react with other reactive groups present in the polymerization reaction medium. Alternatively, monomers can react in the polymerization medium (to form oligomers), followed by reaction of this oligomer with the terminal group of the derivatized GCNF. Oligomers can further react with oligomers. Still further, a combination of these mechanisms can take place.

Still further, the reactive end group of the linker molecule can include more than one reactive functional group. For example, a triamine molecule, in which one amino group can bind to the GCNF surface providing two amino groups to react with monomer or oligomer moieties. Exemplary of linkers are diamines or triamines: (1) aliphatic diamines, 1,6-hexamethylenediamine (HDA) and p-xylylenediamine (XDA); (2) aromatic diamines, 1,4-phenylenediamine (PDA) and 3,4'-oxydianiline (ODA); (3) aromatic triamines, tris(4-aminophenylene)amine (TAPA), 1,3,5-tris(4-aminophenoxy)benzene (TAB), and tris[4-(4-aminophenoxy)phenyl]ethane (TAPE).

Figure 13:
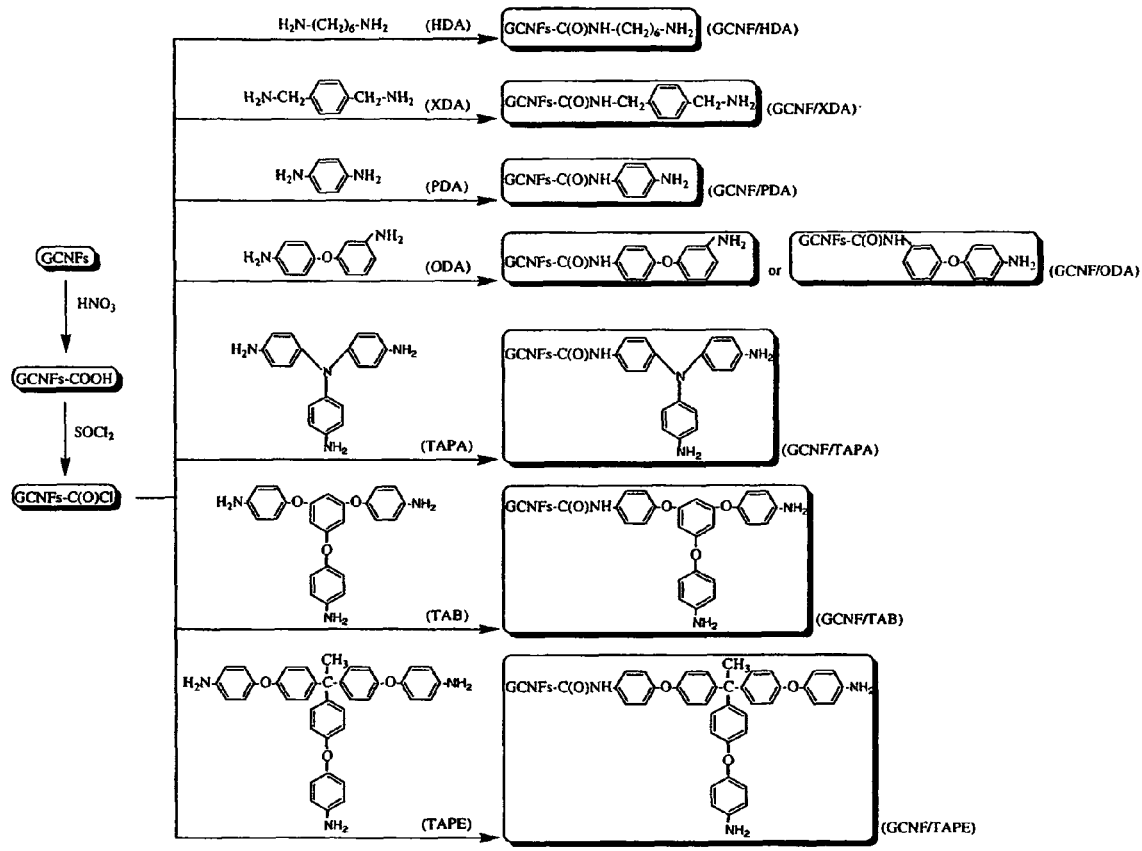
FIG. 13. is a reaction scheme depicting the functionalization and derivatization of GCNF.

GCNF surface oxidation and derivatization by a linker molecule is accomplished by following a stepwise process involving amidation chemistry (Scheme 1—FIG. 13). GCNF materials are characterized by TEM, IR, TGA, laser-desorption/ionization (LDI) mass spectrometry, and by elemental analysis. Approximate GCNF/(linker molecule)x compositions are proposed consistent with acid-uptake and elemental analysis data. Direct evidence identifying linker molecule compositions is provided by LDI mass spectrometry and by quantitative XPS analysis of trifluoroacetylated derivatives, and the presence of reactive pendant amino groups is determined quantitatively via Fmoc analysis and synthetically by effecting, e.g., nucleophilic ring-opening oligomerization of an epoxy monomer.

As indicated previously, epoxy monomers are one type of material that is particularly suited for use in the invention herein. Such materials are widely used to prepare thermoset polymer composite materials. Epoxy resins generally exhibit a good balance of physical, mechanical and electrical properties and also generally exhibit a less degree of cure shrinkage than other thermoset resins, such as polyester and vinyl resins. Epoxy resins are often used with a curing agent to reduce curing time and to achieve the desired properties. Properties, such as chemical resistance, thermal stability and glass transition temperature, can be controlled by the choice of curing agent. When epoxy resins are used as the polymer component of the present invention, the properties of the resulting covalently bound GCNF-polymer composite can be modified by such methods and materials.

Additionally, diluents can be added to reduce resin viscosity, improve shelf and pot life, lower the curing-step exotherm, reduce polymer shrinkage and to reduce material cost. Non-limiting examples of suitable diluents for epoxy resins include butyl glycidyl ether and cresyl glycidyl ether.

As one aspect of the present invention, ODA linker molecules can be reacted with a reactive diluent molecule such as N-butyl glycidyl ether. Such preliminary reaction can be useful to enhance the ability of the linker molecule to react with the polymerization reaction medium. That is, it is believed that by extending the linker molecule, the linker molecule can be extended to improve the resulting GCNF-polymer structure. In one aspect, a GCNF is reacted with an ODA. This ODA is then reacted with n-butyl glycidyl ether. This is, in turn, reacted with a resin material, such as an epoxy resin, to provide the covalently bound GCNF-polymer composite of the present invention. Without being bound by theory, it is believed that extension of the original ODA linker molecule to an ODA (glycidyl)n linker enhances the wettability of the GCNF in the polymerization reaction medium. It is also believed that this can reduce or eliminate steric hindrance of the GCNF bulk at the linker molecule terminus, thereby facilitating covalent coupling across the GCNF/epoxy matrix interface during thermal curing.

The curing parameters for epoxy resin polymerization can be modified to change the final properties of the GCNF-polymer composites. In particular, the cure time and temperature can be controlled. Generally, however, it is currently believed that the curing parameters provided by the resin suppliers are suitable for preparing the GCNG-polymer materials of the present invention.

When the functionalized or derivatized GCNF is added to a monomer present in the polymerization reaction medium, the GCNF can be dispersed in the monomer by stirring, shaking (ultrasonic or otherwise) or any other suitable method. Such dispersal methods can be useful to ensure that there is suitable mixing and can also improve the polymerization reaction by making more monomeric species available for polymerization. A solvent can also be added to reduce the viscosity of the polymerization medium so as to make the mixing more efficient.

In some aspects, the functionalized or derivatized GCNF and the monomeric, polymeric and/or oligomeric materials can be mixed using sonication. A low speed mixing, such as by low power sonication, can be used to effect dispersion. Still further, a high power sonication can be used. When a high power sonication is used, the GCNF can be reduced in size. Heating can also be used during sonication to enhance the reaction of the functionalized GCNF and the monomer, polymer and/or oligomeric material in the polymerization reaction medium.

The size of the GCNF or derivatized fibers may be relevant in some aspects.

That is, it is currently believed that the GCNF fibers should be of a size that is small enough to ensure good mixing of the GCNF in the polymerization reaction medium. The GCNFs or derivatized fibers can be less than about 500 nm or less or about 400 nm or less or about 300 nm or less or about 200 nm or less.

Other types of polymers may be covalently attached to GCNFs according to the invention herein. Of course, the type of polymer to be obtained will be determined by the monomer utilized in the polymerization reaction.

For example, in addition to epoxy, other types of thermoset polymers, such as polyurethanes, may be covalently bonded to GCNFs in the invention herein. The type of linker molecule used to prepare covalently bound GCNF-polyurethane composite materials should be a molecule having a terminal end suitable for reaction with polyurethane materials.

Additionally, thermoplastic polymers can be covalently bonded to GCNFs in the invention herein. Thermoplastic polymers suitable for use herein include, but are not limited to, polystyrene, polyethylene, poly(vinyl chloride), polyesters, polyamides, polyimides, acrylates and the like.

Anyone of a number of polymerization reaction types is suitable for use in the present invention. As non-limiting examples, the following polymerization reaction types can be used to prepare the GCNF-polymer composites of the present invention: step growth polymerization, free radical polymerization, emulsion polymerization and atom-transfer radical polymerization.

Atom transfer radical polymerization (ATRP) is a controlled "living" polymerization system. ATRP polymerization is based on a reversible exchange between a low concentration of growing radicals and a dormant species. Reactivation of the dormant species allows the polymer chains to grow and deactivate again. The radical formation is occurred by transition metal catalyst that activates the organic initiator or dormant species by abstracting the halide at the chain end. This process results in a polymer chain that grows slowly and steadily and has a well-defined end group, because under appropriate conditions the contribution of termination is small. By ATRP polymers with controlled molar masses and small polydispersities can be obtained. ATRP is capable of polymerizing of wide variety of monomers and is tolerant of trace impurities, thus ATRP is readily applicable to industrial processes.

As described above with epoxy monomers, the polymerization reaction conditions can be varied to modify the properties of the finished GCNF-polymer composite. Further, additives, diluents, etc. can be added to the polymerization reaction to vary the resulting material. The polymerization reactions can be conducted in batch, semi-batch or continuous processes.

The amount of GCNF in the final GCNF-polymer composite can be from at about 0.01 wt. % to about 10.0 wt. %, as measured by total weight of the GCNF polymer composite. Still further, the amount of GCNF in the finished composite can be from about 0.1 wt. % to about 5.0 wt. %, as measured by total weight of the GCNF polymer composite. Yet still further, the amount of GCNF in the finished composite can be from about 0.1, 0.5, 1.0, 1.5, 2.0, 2.5, 3.0, 3.5, 4.0, 4.5, 5.0,5.5,6.0,6.5, 7.0, 7.5, 8.0, 8.5, 9.0, 9.5 or 10.0 wt. %, as measured by total weight of the GCNF-polymer composite, where any value can form an upper or a lower endpoint, as appropriate, or up to the dispersibility limit of the incorporated reactive, derivatized GCNF component.

In addition to monomeric species, in some aspects, it may be beneficial to use oligomeric species to enhance the length of the final polymer. Suitable oligomeric species that can be used in the polymerization reactions described herein are known to one of ordinary skill in the art.

The GCNF-polymer composite materials of the present invention can be used in any manner that non-covalently bound polymer composites can be used, such as in aircraft, automobiles, structural application and the like. The GCNF-polymer composites of the present invention can also be used as components in other materials as would be known to one of ordinary skill in the art.

In one aspect, the GCNF-polymer composite materials can be used as component in other polymer systems. For example, a GCNF-epoxy composite prepared according to the invention herein, can be added to a neat epoxy resin to provide a fiber-reinforced epoxy resin not previously known.

Turning now to the Figures, GCNF-ODA nanofibers, obtained by amide condensation of ODA with surface-enhanced GCNFs, possess surface-bound ODA linker molecules containing pendant aromatic primary amino functional groups, as shown in FIG. 1 for one structural isomer. As-prepared herringbone GCNF-ODA nanofibers are typically about 25 to about 200 nm wide and from about 5 to about 10 microns long (see FIG. 2). High-power sonication of GCNF-ODA nanofibers in butyl glycidyl ether cuts the length of GCNF-ODA nanofibers into ca. 0.2 micron segments (see FIG. 3) with simultaneous activation of nucleophilic, ring-opening amine/glycidyl coupling to give highly reactive GCNF-ODA(glycidyl)n, r-GCNF-ODA, nanofibers (see FIG. 4). Surface-bound glycidyl oligomers having n=1-4 have been identified using laser-desorption mass spectrometry.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature, and pressure is at or near atmospheric.

In the following examples, Transmission electron microscopy (TEM) was performed on a Philips CM-20T Electron Microscope operated at 200 KeV. Proton nuclear magnetic resonance spectra (NMR) were recorded on a Bruker AC300 FT-NMR Spectrometer using tetramethylsilane (TMS) as internal standard. Infrared spectra (IR) were recorded from KBr pellets on an ATI Mattson Genesis Series Ff-IR spectrometer.

Laser desorption/ionization mass spectra (LDI-MS) were acquired using an Applied Biosystems Voyager DE-STR mass spectrometer (Framingham, Mass.) with a 337 nm $N_2$ laser. The acceleration voltage was 25 kV, and the spectra were acquired in the linear mode with positive ion detection. For sample preparation, the sample powders were spread onto double-sided carbon tape and placed on the mass spectrometer sample plate.

X-ray photoelectronic spectroscopic (XPS) curves were collected on a Leybold Heraeus ES-10 X-ray photoelectron spectrometer. For sample preparation, the sample powders were placed on double-sided carbon tape adhered to the sample mount. Spectra were acquired with Mg K$\alpha$: excitation at 250 watts of power (12.5 kV voltage and 20 mA current) and with 200 eV pass energy. XPS spectra were collected of the fluorine 1 s (689 eV) and nitrogen Is (400 eV) regions. To determine the relative sensitivity factors for fluorine and nitrogen both the F 1 s region and the N 1 s region for the XPS spectra of ODA(TFA)$_2$ sample (synthesized as below) were collected and integrated. If the measured sensitivity factor for fluorine on the XPS instrument is set to a value of unity (SF=1), the measured sensitivity factor for nitrogen (SN) using ODA(TFA)$_2$ is 0.28.

Bulk elemental analysis was performed by Atlantic Microlab, Inc. Norcross, Ga. Every sample was analyzed twice and values were averaged for composition calculation. Thermogravimetric analyses (TGA) were performed on a Thermal Analysis Instruments High-Resolution TGA 2950 Thermogravimetric Analyzer with heating rate of 15° C. min$^{-1}$ in an atmosphere of nitrogen. BET surface area analysis was determined from $N_2$ adsorption/desorption isotherms recorded with a Quantachrome NOVA 1000 high-speed surface-area analyzer. Surface acidic functionality was determined by the base uptake method. Approximately 100 mg of the surface-treated nanofibers were placed into 40 mL of 0.001 M sodium hydroxide solution. The mixture was allowed to sit for 18 hours. The pH value was recorded before and after base uptake. The number density of acidic sites was calculated.

Similarly, surface basic functionality was determined by the acid uptake method. Approximately 200 mg of the surface-treated nanofibers were placed into 40 mL of 0.001 M hydrochloric acid solution. The mixture was allowed to sit for 18 hours. The pH value was recorded before and after acid uptake. The number density of basic sites was calculated.

The content of free primary amino groups on surface-derivatized nanofibers was quantitatively determined by Fmoc analysis. In a typical experiment, 150 mg of derivatized GCNFs were mixed with 175 mg of fluorenylmethyloxycarbonyl aminohexanoic acid (Fmoc-Ahx-OH, NOVA Biochem), 67.5 mg of 1-hydroxybenzotriazole (HOBt, Aldrich) and 1 mL of N,N-dimethyl formamide (DMF). After dissolution of Fmoc-Ahx-OH and HOBt, 80 µL of N,N'-diisopropylcarbodiimide (DIC, Aldrich) was added. Reaction occurred by shaking for 12 h. The mixture was filtered and the solid was washed with DMF, methanol and methylene chloride and dried in reduced pressure overnight. 20 mg of dried sample was mixed with 3 mL of mixture of piperidine (Aldrich) and DMF (20:80) and shaken for 45 min. After centrifuging, the UV absorption of the supernatant was measured at 290 nm and the concentration of amino groups in the functionalized GCNF samples was calculated.

Herringbone-type carbon nanofibers were grown by the interaction of a carbon source gas with mixed-metal powder growth catalyst, following a modified literature procedure. Iron-copper powder with atomic ratio of 7:3 was prepared by the coprecipitation of the respective metal nitrate solutions, containing Fe(NO$_3$)$_3$·9H$_2$O (4.84 g, 12.0 mmol) and Cu(NO$_3$)$_2$·3H$_2$O (1.26 g, 5.2 mmol) with excess ammonium bicarbonate. The precipitate was dried in an oven at 110° C. and ground into fine powder (1.5 g). The powder (300 mg) was put into a quartz boat in a horizontal tubular furnace and was converted into metal oxide mixture by calcining in the air at 400° C. for 4 h. The mixed-metal oxide was reduced in a 20% H$_2$/He flow of 250 mL/min at 500° C. for 20 h. After the catalyst was further reduced at 600° C. for 2 h, ethylene was introduced to the reactor with the gas composition of 4:1:1 for C$_2$H$_4$:H$_2$:He (total 300 mL/min). The growth of carbon nanofibers was completed at 600° C. after 90 min. The product was cooled to room temperature under helium and collected (10.7 g). Anal. Found: C, 95.78; H, 0.29; 0,0.22.

To derivatize the carbon nanofibers, GCNFs (2.0 g) were treated with concentrated nitric acid (200 mL) at 140° C. for 4 h. After washing with deionized water until the filtrate reached a pH value of ca. 7, the sample was dried in vacuo at room temperature and collected (1.4 g). Anal. Found: C, 86.82; H, 0.50; N, 0.22. The surface-oxidized carbon nanofibers were acylated by reaction with thionyl chloride (30 mL) at 70° C. for 24 h with 0.5 mL of N,N-dimethyl formamide (DMF). The mixture was cooled and washed with distilled tetrahydrofuran (THF) under nitrogen until the supernatant was clear. The black solid of surface-acylated carbon nanofibers was dried with purging nitrogen at room temperature for further use.

Example 1

Preparation of GCNFs Surface-Derivatized with Oxydianiline (GCNFODA)

Herringbone-type carbon nanofibers were synthesized as disclosed in U.S. Pat. No. 6,537,515 B1 and U.S. Patent Publication No. 2002/0054849 A1. A sample of as-prepared herringbone GCNFs was heated with concentrated nitric acid at 140° C. for 4 h. The collected oxidized GCNFs were washed with deionized water until the filtrate reached a pH value near 7 and then were dried at reduced pressure at room temperature. The dry, oxidized GCNFs were activated by reaction with thionyl chloride containing a small amount of dimethylformamide (DMF) at 70° C. for 24 h.

The reaction mixture was cooled and then filtered. The collected fibers were washed with tetrahydrofuran (THF) under nitrogen until the supernatant was colorless. The black solid was dried at room temperature and then reacted with excess oxydianiline (ODA) at 100° C. under nitrogen for 96 h. The mixture was cooled to room temperature. Excess oxydianiline was dissolved by stirring the reaction mixture with ethanol for 30 min. After vacuum filtration and washing with acetone, the oxydianiline-derivatized graphitic carbon nanofibers (GCNF-ODA) were dried at reduced pressure overnight.

An infrared spectrum of the GCNF-ODA nanofibers revealed an absorption band at 1616 cm$^{-1}$ consistent with the presence of amide bond linkages at the carbon fiber surface. The product GCNF-ODA nanofibers were analyzed by elemental analysis and TGA, and the presence of pendant free amino groups was quantified independently by acid-uptake measurements and by standard Fmoc analysis of primary amines. Analytical data is consistent with an average nanofiber composition of $C_{300\pm200}(NH_2)_1$.

Example 2

Surface-derivatized GCNF-ODA nanofibers having dimensions of 50 to 200 nm wide and 5 to 10 microns long were reduced in length by ultrasonication using a commercial sonifier at a power level of 70 watts for a 60-min duration. Unexpectedly, ultrasonication of the surface-derivatized nanofibers has resulted in the production of composites having unusually high degrees of flexural strength. A diluent, butyl glycidyl ether (Aldrich Chemical Co.), was used as dispersant for this cutting procedure. The cut fiber/diluent mixture was stored in a sealed vessel for over 30 h at room temperature and was then divided into two parts. One portion was directly added into an epoxy resin, the other part was first dried in a vacuum oven at 100° C. for 2 days and then dispersed in epoxy resin. For each procedure, nanocomposites with fiber loadings of 0.3 wt % and 1.3 wt % were prepared. Two commercial liquid bisphenol A based epoxy resins, Epon® 828 with viscosity of 110-150 poise and 826 with viscosity of 6595 poise (Miller-Stepheson Chemical Company, Inc.) were used as epoxy resins (100 parts in weight), and borontrifluoride-monoethylamine, BF$_3$-MEA (Aldrich Chemical Company), was used as a curing agent (2.75 parts to 828 epoxy resin and 2.9 parts to 826 epoxy resin in weight). Epoxy resin and curing agent were mixed at 90° C., and then the appropriate portion of dried nanofibers or nanofiber/diluent blend were added and mixed by low-power sonication for 60 min. Following dispersion by sonication, each sample was filtered to remove any residual large agglomerated particles, cast into a standard mold, and then cured at reduced pressure in a vacuum oven at the following curing cycles (where Rt. refers to room temperature.):

Rt.—120° C./1 h—170° C./2 h—cooling down to Rt. naturally (as suggested by the resin vendor)
Rt.—120° C./1 h—160° C./2 h—170° C./1 h—cooling down to Rt. naturally
Rt.—120° C./1 h—160° C./2 h—160° C./8 h—cooling down to Rt. naturally A Bransonic® Ultrasonic Cleaner 1210 (Branson Ultrasonics Corporation) was used to disperse the r-GCNF-ODA nanofibers in the epoxy resins (duration period of 60 minutes). A Digital Sonifier® 450 operating at a frequency of 20 kHz with controllable power output (Branson Ultrasonics Corporation) was used to cut nanofibers by sonicating GCNF-ODA nanofiber at 70 watts for 60 min as a suspension in the diluent, butyl glycidyl ether. For this sonication processes, the tip of the sonifer horn was directly immersed into the nanofiber/diluent mixture and an ice water bath was used to cool the reaction vessel.

A Hi-Res Thermogravimetric Analyzer TGA 2950 of TA Instrument Company was employed to analyze degradation of surface-bound linker molecules of the GCNF-ODA nanofibers during heating. Changes in heat content as a function of temperature were measured using a differential scanning calorimeter (DSC 2920 of T A Instrument Company). A Hitachi S-4200 SEM was used to observe the fracture surface area of the broken bending specimens. Bending tests were conducted according to ASTM D790-00 (Standard Test Methods for Flexural Properties of Un-reinforced and Reinforced Plastics and Electrical Insulating Materials). A testing machine MTS 810 was used for the bending tests. The loading rate was 1 mm/min.

Transmission electron micrographs (TEM) were obtained using Philips CM20T TEM microscope operating at 200 kV in the bright-field mode. Samples were supported on 3-mm holey carbon-copper grids (SPI Supplies).

Example 3

In one example of the present invention, r-GCNF-ODA derivatized nanofibers were found to be useful as reactive reinforcement for epoxy resin composite materials. Such fibers are "reactive" GCNF formed when GCNF-ODA fibers are reacted with epoxy monomer. (These fibers are shown in FIG. 4.) Mild sonication readily dispersed the shortened nanofiber segments throughout an epoxy resin. In addition, extension of the original ODA linker molecule to an ODA (glycidyl)n linker enhanced the wettability of the GCNF reinforcement material and reduced or eliminated any possible steric hindrance by the nanofiber bulk on further chemical reactivity at the linker molecule terminus, thereby facilitating covalent coupling across the GCNF/epoxy matrix interface during thermal curing.

Both r-GCNF-ODA/epoxy mixtures and the thermally cured r-GCNFODA/epoxy composite monoliths were found to exhibit a uniform, black appearance with no visual evidence of phase separation.

TGA degradation curves for samples of as-prepared GCNF-ODA and dried rGCNF-ODA nanofibers are shown in FIG. 5. At temperatures above ca. 230° C., greater mass loss was observed for r-GCNF-ODA nanofibers, as was expected for nanofibers containing an extended linker molecule. Assuming that the cumulative mass losses observed at 900° C. represent loss of ODA linker fragments [scan (a)] or loss of ODA(glycidyl)n extended linker fragments [scan (b)], the average compositions of the GCNF-ODA and r-GCNF-ODA samples were calculated to be C89(ODA)] and C89(ODA)t (butyl glycidyl)1.7, respectively.

These compositions were consistent with other analytical data for the average composition of as-prepared GCNF-ODA nanofibers and with mass spectrometric data showing values of n=1-4 for the glycidyl portion of r-GCNF-ODA nanofibers.

The extended linker molecules present in r-GCNF-ODA nanofibers were found to react with epoxy resin through additional oxirane ring-opening reactions during the heating and curing cycles of r-GCNF-ODA/epoxy resin processing. In this fashion, rGCNF-ODA nanofibers became covalently incorporated into the cross-linked structure of the resulting cured nanocomposite material.

To access optimal nanocomposite performance, the presence of r-GCNF-ODA nanofibers was observed for affects the overall curing process of the final nanocomposite.

Example 4

Dry r-GCNF-ODA nanofibers were added into a mixture of Epon® 826 epoxy resin and $BF_3$-MEA, and nanocomposites with fiber loadings of 0.3 wt % and 1.3 wt % were prepared at various stages of curing. Thermochemical processes that occur during nanocomposite curing were analyzed by DSC. DSC results from uncured nanofiber/epoxy mixtures are shown in FIG. 6, and those results shown in FIG. 7 are of the corresponding cured composites.

There were effects seen due to the presence of the reactive nanofibers, r-GCNFODA, on the curing process. For the uncured samples, the temperatures of both the initial reaction point $T_i$ and the reaction peak point Tp increased with fiber loading, which means more heat is needed for nanocomposite curing.

Two major physical transitions were usually observed during curing. At the molecular level, gelation started at $T_i$ and corresponded to a transition from linear or branched molecules to an infinite network of chains. Vitrification represented a transition from a rubbery state to a glassy state. At the gel point, the weight-average molecular weight of a resin approaches infinity. Further increase in the degree of curing beyond this gel point causes a rapid rise in an insoluble fraction (termed gel) formed by the crosslinking of these large molecules. More and more chains were incorporated in the cross-linked network, and the proportion of the soluble molecules (termed sol) of the resin diminishes. For the r-GCNF-ODA nanofibers, which functioned as a curing agent for epoxy resins and have a larger molecular size than $BF_3$-MEA curing agent, more heat was required for the overall curing process. The gelation process was especially affected, which results in an increase in both $T_i$, and $T_p$ with $T_i$ increasing the most.

r-GCNF-ODA/epoxy resins with 0.3 wt % and 1.3 wt % fiber loading, respectively, were cured at 120° C. for 1 h and then at 170° C. for 2 h, as suggested by the vendor. The DSC curves in FIG. 7 show a decrease in degree of curing with increasing fiber loading. According to the following equation, the degree of curing a, can be calclated from these DSC curves, as follows:

$$\alpha = \frac{\int_{T_f}^{T_f} dQ_u - \int_{T_i}^{T_f} dQ_c}{\int_{T_i}^{T_f} dQ_u} \times 100\%$$

where, $T_j$ is the initiation temperature, meaning the temperature required to initiate gelation (also called $T_{gel}$): $T_f$ is the final temperature; $Q_u$ is the quantity of heat released for an uncured sample; and, $Q_c$ is the quantity of heat released for the corresponding cured sample. A similar set of cured and uncured r-GCNF-ODA/epoxy nanocomposites were prepared at the same nanofiber loadings of 0.3 wt % and 1.3 wt % using a more viscous epoxy resin, Epon® 828. The DSC curves of these samples were also recorded for uncured and cured mixtures. The initial reaction temperatures, reaction peak temperatures and degree of curing are listed in FIG. 11. These results indicate that the presence of r-GCNF-ODA nanofibers affects the curing of both types of epoxy resins to a similar extent. The degree of curing decreases as fiber loading increases, and more heat is required for the curing process of nanocomposites containing higher nanofiber loading. Property measurement data support this observation (vide infra).

Example 5

Preparation of Carbon Nanofibers with Surface-Bound 1,6-Hexamethylenediamine (HDA) Surface-acylated GCNFs were reacted with 1,6-hexamethylenediamine (10 g) at 100° C. under nitrogen for 96 h. The mixture was cooled to room temperature. The excess 1,6-hexamethylenediamine was dissolved by stirring with acetone for 30 min. After vacuum filtration and washing with acetone, the 1,6-hexamethylenediamine-derivatized graphitic carbon nanofibers (GCNF/HDA) were dried at reduced pressure overnight. Anal. Found: C, 87.44; H, 1.66; N, 2.35.

Example 6

Preparation of Carbon Nanofibers with Surface-Bound p-Xylylenediamine (XDA)

Surface-acylated GCNFs were reacted with p-xylylenediamine (10 g) at 100 ° C. under nitrogen for 96 h. The mixture was cooled to room temperature. The excess p-xylylenediamine was dissolved by stirring with toluene for 30 min. After vacuum filtration and washing with toluene, the p-xylylenediamine-derivatized graphitic carbon nanofibers (abbreviated as GCNF/XDA) were dried at reduced pressure overnight. Anal. Found: C, 84.17; H, 1.92; N, 4.00. Preparation of Carbon Nanofibers with Surface-Bound 1,4-Phenylenediamine (PDA)

Surface-acylated GCNFs were reacted with 1,4-phenylenediamine (10 g) at 150° C. under nitrogen for 96 h. The mixture was cooled to room temperature. The excess 1,4-phenylenediamine was dissolved by stirring with ethanol for 30 min. After vacuum filtration and washing with ethanol, the 1,4-phenylenediamine-derivatized graphitic carbon nanofibers (abbreviated as GCNF/PDA) were dried at reduced pressure overnight. Anal. Found: C, 85.31; H, 1.44; N, 3.97.

Example 7

Preparation of Carbon Nanofibers with Surface-Bound 3,4'-Oxydianiline (ODA)

Surface-acylated GCNFs were reacted with 3,4'-oxydianiline (10 g) at 100° C. under nitrogen for 96 h. The mixture was cooled to room temperature. The excess 3,4'-oxydianiline was dissolved by stirring with ethanol for 30 min. After vacuum filtration and washing with ethanol, the 3,4'-oxydianiline-derivatized graphitic carbon nanofibers (abbreviated as GCNF/ODA) were dried at reduced pressure overnight. Anal. Found: C, 86.66; H, 1.19; N, 2.14.

Example 8

Preparation of Carbon Nanofibers with Surface-Bound Tris(4-aminophenylene)amine (TAPA)

Tris (4-aminophenyleneamine (TAPA) was prepared by reduction of tris(4-nitrophenylene)amine with 10 wt % Pd/C catalyst following the literature procedure. Surface-acylated GCNFs were reacted with tris(4-aminophenylene)amine (5 g) at 250° C. under nitrogen for 1 h. The mixture was cooled to room temperature. The excess tris(4-aminophenylene) amine was dissolved with ethanol. The tris(4-aminophenylene)amine-derivatized graphitic carbon nanofibers (abbreviated as GCNF/TAPA) were obtained by vacuum filtration and dried at reduced pressure overnight. Anal. Found: C, 88.63; H, 1.40; N, 3.40.

Example 9

Preparation of Carbon Nanofibers with Surface-Bound 1,3,5-Tris(4-aminophenoxy)benzene (TAB)

Surface-acylated GCNFs were reacted with TAB (5 g) at 150° C. under nitrogen for 96 h. The mixture was cooled to room temperature. The excess TAB was dissolved by stirring with ethanol for 30 min. After vacuum filtration and washing with ethanol, the TAB-derivatized graphitic carbon nanofibers (abbreviated as GCNF/TAB) were dried at reduced pressure overnight. Anal. Found: C, 86.66; H, 1.33; N, 2.32.

Example 10

Preparation of Carbon Nanofibers with Surface-Bound Tris[4-(4-aminophenoxy)phenyl]ethane (TAPE)

Surface-acylated GCNFs were reacted with TAPE (5 g) at 220° C. under nitrogen for 4 h. The mixture was cooled to room temperature. The excess TAPE was dissolved by stirring with dimethyl sulfoxide for 30 min. After vacuum filtration and washing with dimethyl sulfoxide, the TAPE-derivatized graphitic carbon nanofibers (abbreviated as GCNF/TAPE) were dried at reduced pressure overnight. Anal. Found: C, 86.32; H, 1.36; N, 1.65.

Example 11

Sonication of GCNF/ODA with Butyl Glycidyl Ether

Surface-derivatized GCNF/ODA products (0.25 g) were shortened in length via ultrasonication using a Branson Digital Sonifier (Model 450) at a power level of 70 watts for 60 min. A diluent, butyl glycidyl ether (BGE, 20 mL, Aldrich), was used as dispersing reagent for this shortening procedure. Excess diluent was evaporated at 80° C. and a solid sample of GCNF/ODA/(BGE)n was obtained.

Example 12

Trifluoroacetic Anhydride (TFAA) Treatment of Functionalized GCNFs for XPS Measurements In a typical TFAA treatment experiment, 100 mg of derivatized GCNFs were stirred with 1.2 mL of N,N-diisopropylethylamine (DIEA, 7 mmol) and 10 mL of ether. To the suspension was added 1 mL of trifluoroacetic anhydride (7 mmol). After reaction at room temperature for 3 days with continuous stirring, the reaction mixture was filtered. The black solid was washed with ether, acetone, water, and acetone and dried in reduced pressure overnight.

A calibration standard was prepared by derivatizing the free diamine ODA with TFAA following the same reaction procedure as above. After reaction at room temperature for 4 hours with continuous stirring, the solution was mixed with 10 mL water. The organic layer was collected and filtered. The target product [ODA(TFA)$_2$] was isolated with column chromatography and collected by evaporating the solvent. $^1$H NMR (300 MHz, CD$_2$Cl$_2$): δ [ppm]=1.50 (s, 2H, NH), 6.83-7.88 (m, 8H, Ar); ESI-MS 393.3 amu [ODA(TFA)$_2$], (M+H)$^+$].

GCNFs having a herringbone graphene layer structure are prepared by a known process in which decomposition of a carbonaceous gas on an appropriate metal catalyst directs carbon nanofiber growth. Covalent attachment of linker molecules to GCNF surface sites is accomplished by following the stepwise process shown in Scheme 1. As-prepared GCNFs are treated with nitric acid to form surface-bound carboxylic acid functional groups. Such oxidized GCNFs are then treated with thionyl chloride forming surface-bound acid chloride functional groups that condense readily with NH$_2$ groups to bind linker molecules at GCNF surface sites through amide functional groups. In this study, seven different diamines and triamines are used for surface binding to form linker molecules possessing one or more pendant primary amino groups suitable for further reaction.

The representative GCNF materials prepared were evaluated. As-prepared GCNFs have an average diameter of ca. 200 nm and usually contain metal growth catalyst particles affixed to the nanofiber terminus. Following oxidation by nitric acid, the resulting oxidized GCNFs have the same nanofiber morphology, although acid etching removes any residual metal growth catalyst nanoparticles and any amorphous carbon by-product initially present in the as-prepared GCNFs. Surface derivatization with a linker molecule, such as ODA, also occurs with retention of overall nanofiber morphology.

Example 13

Qualitative Characterization of GCNF Materials Infrared (IR) Spectra

Infrared spectra of as-prepared, oxidized, and the seven surface-derivatized GCNF materials described above are provided as Supplementary Data. Particularly noteworthy spectral features are discussed below.

Bands at 1579 and 1181 cm$^{-1}$ observed in the IR spectra of as-prepared GCNFs correspond to C═C stretching and bending vibrations of the graphene backbone. Intense peaks centered at ca. 3435 cm$^{-1}$ are assigned to the presence of physically absorbed water, while weak bands at ca. 3000 cm$^{-1}$ are assigned to C—H bond stretching vibrations arising from hydrogen-atom termination at carbon edge sites.

IR spectra of oxidized GCNFs contain a similar band at 1578 cm$^{-1}$ for C═C stretching confirming that the nanofiber graphene backbone structure is unaffected by treatment with nitric acid, consistent with the TEM observations presented above. A new band appears at 1719 cm$^{-1}$, which is attributed to C═O stretching vibrations of surface carboxylic acid groups, as observed for acid-oxidized SWNTs.

Following surface acylation of oxidized GCNFs by thionyl chloride and amide condensation with an amine reagent, such as hexamethylenediamine, the IR C⊚O stretching band assigned to carboxylic acid groups is dramatically reduced in intensity, typically leaving only weak peaks in the carbonyl stretching region. Unfortunately, the expected carbonyl stretching band for surface-bound amide functional groups, which appears at 1616 cm$^{-1}$ for SWNTs derivatized with octadecylamide groups, overlaps with the intense graphene stretching band at 1578 cm$^{-1}$. IR spectra of the other six GCNF/linker molecule materials reveal similar reductions in intensity of the corresponding $CO_2$H carbonyl-stretching bands upon amidation with no direct observation of amide carbonyl-stretching bands due to peak overlap.

Example 14

Laser Desorption/Ionization Mass Spectra (LDI-MS) and Reaction with Butyl Glycidyl Ether GCNF materials prepared in this study have been examined by LDI-MS to obtain direct evidence for the presence of covalently bound linker molecules. In this technique, laser irradiation (337 nm) absorbed by the GCNF matrix leads to direct desorption and ionization of surface analyte species along with ionized fragments of the carbon matrix.

LDI-MS spectra of as-prepared GCNFs, oxidized GCNFs, and the seven GCNF/linker molecule materials described herein along with the mass spectra of the corresponding pure amines used as linker molecules are provided as Supplementary Data. Parent ions and assignments of prominent fragment ions are identified on each mass spectrum.

Mass spectra of as-prepared and surface-oxidized GCNFs show few fragment ions at low m/z values. The mass spectrum of as-prepared GCNFs contains a base peak at 39 m/z and a peak of much lower intensity at 73 m/z. The peak at lower m/z is assigned to endogenous K$^+$ ion, while the fragment of higher mass is identified as the $C_6H^+$ carbon cluster. Carbon cluster ion formation is also observed in the mass spectra of carbon films. Mass spectra of oxidized GCNFs contain a base peak for potassium ion along with a cascade of peaks assigned to $C_4$-$C_{10}$ carbon cluster cations. A peak at 46 m/z is assigned to the formic acid ion, [HCOOH]$^+$, that could form during ionization of surface-bound $CO_2$H functional groups. Ions of other carbonaceous clusters containing undetermined numbers of oxygen and hydrogen atoms are also evident.

Comparison of the mass spectrum of each GCNF/linker molecule material with that of the corresponding pure amine reveals a close match of parent ion, base peak, and main fragment ions within each pair of samples. While this correspondence is consistent with each linker molecule being uniquely present within a given GCNF/linker molecule material, direct confirmation of an amide functional group binding linker molecules to the GCNF surface is not observed by LDI-MS with the possible exception of the GCNF(TAPA) material. In addition, mass spectra of GCNF/linker molecule materials all show peaks at m/z values substantially greater than that of the corresponding pure amine. In most cases, these unidentified ions have masses sufficiently large to be assigned as non-covalent complexes between parent ions and prominent fragment species of the corresponding linker molecules. However, for the GCNF(TAPA) material, a mass spectral peak at 316 m/z is observed. This peak is only 26 amu greater than the mass of the neutral TAPA triamine (290 amu) and could be assigned to a cationic isocyanate species, such as (O═C═N-TAPA)$^+$, derived from a surface-bound TAPA-amido linker molecule (see Scheme 1).

As a control study, oxidized GCNFs were separately reacted with a representative aromatic (ODA) and aliphatic (HDA) diamine without thionyl chloride activation under the same reaction procedures reported above. LDI-MS spectra of the obtained product materials did not contain any ion fragments identifiable with the corresponding diamine reagents. This result confirms that intermediate reaction with thionyl chloride is necessary to observed linker molecule ionization and suggests that covalent amidation of linker molecules to GCNF surface sites is likely. Any linker molecules physisorbed or associated with nanofibers through acid-base reactions do not survive the reaction and purification procedures.

To confirm the presence of a reactive, pendant amino group in a representative GCNF/linker molecule material, GCNF/ODA nanofibers have been reacted with neat butyl glycidyl ether (BGE). The LDI-MS mass spectrum is set forth in the supplemental data. Surprisingly, the base peak at 228 m/z can now be assigned to the protonated form of the expected ODA-amide linker molecule formed by covalent amide condensation of ODA with a surface-bound acid chloride functional group. In addition, a pattern of three peaks of decreasing intensity at m/z values of 358, 488, and 618 is observed in which each peak is separated by the mass of one butyl glycidyl ether monomer (130 amu). This spectrum indicates that this product is best described as, GCNF/ODA/(BGE)$_n$, in which the amino terminus of surface-bound ODA linker molecules initiates nucleophilic ring-opening of BGE monomers to covalently extend the linker molecule structure by at least a three-epoxy oligomeric unit. Thus, the presence of an amide-bound linker molecule containing a reactive pendant amino functional group in the GCNF/ODA material can be inferred.

Example 15

X-ray Photoelectronic Spectroscopy (XPS)

Additional evidence supporting covalent binding of the seven linker molecules investigated in this study to GCNFs has been obtained using a known XPS analysis technique for identifying surface amine functional groups. In this method, surface amino groups are quantitatively acylated by reaction with trifluoroacetic anhydride (TFAA) to form the corresponding trifluoroacetamide. The F/N atomic ratio of the product material can then be determined from the relative intensities of the N 1 s (400 eV) and F 1 s (689 eV) XPS peaks corrected to a standard sample. Surface nitrogen atoms present as amides will contribute to the N 1 s XPS peak intensity but will not react with TFAA. Therefore, the relative number of amino and amido N atoms present within each diamine or triamine (either as a free molecule or as a linker molecule) can be obtained from F/N atomic ratios experimentally determined by XPS (see Scheme 2 and table 1). Control experiments confirm that as-prepared and surface-oxidized GCNFs do not react with TFAA to produce a detectable F 1 s peak.

TABLE 1

| Pure Ami | F/N[a] | GCNF/lin Material | F/N[a] (Monode binding) | F/N[a] (Diden bindin) | F/N[b] (Observed) |
|---|---|---|---|---|---|
| HDA | 3 | GCNF/H | 1.5 | 0 | 1.7 ± 0.3 |
| XDA | 3 | GCNF/X | 1.5 | 0 | 1.2 ± 0.3 |
| PDA | 3 | GCNF/P | 1.5 | 0 | 1.5 ± 0.2 |
| ODA | 3 | GCNF/O | 1.5 | 0 | 1.7 ± 0.4 |
| TAP | 2.25 | GCNF/T | 1.5 | 0.75 | 1.5 ± 0.3 |
| TAB | 3 | GCNF/T | 2 | 1 | 2.4 ± 0.3 |
| TAP | 3 | GCNF/T | 2 | 1 | 1.2 ± 0.3 |

[a]Calculated
[b]As determined from XPS F 1s and N 1s

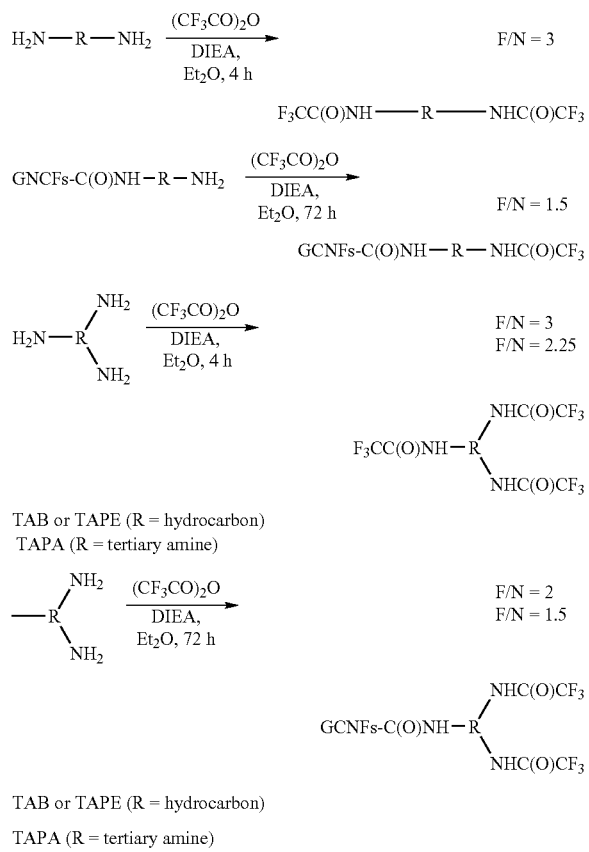

Scheme 2. Reaction of free and surface-bound diamines (HDA, XDA, PDA or ODA) or triamines (TAPA, TAB, TAPE) with trifluoroacetic anhydride showing the F/N atomic ratios of products.

The theoretically expected and experimentally determined F/N atomic ratios for the seven GCNF/linker molecule materials reported in this study are given in Table 1 along with experimental standard deviations. For the four GCNF/diamine (HDA, XDA, PDA, and ODA) materials, the experimental F/N atomic ratios are within one standard deviation of values predicted from the structures shown in Scheme 1 based on monodentate surface attachment via amidation.

For the three GCNF/triamine (TAB, TAPA, and TAPE) materials, two different binding modes are evident. The TAPA and TAB linkers give F/N atomic ratios consistent with the monodentate surface-amidation structure depicted in Scheme 1. However, the largest triamine, TAPE, has a F/N atomic ratio consistent only with didentate surface-amide attachment to GCNF surface sites. This binding mode would be expected in those cases where (1) a sterically bulky, pyramidal triamine adopts orientations that places a second amino group within proximity to the GCNF surface, and, (2) when the number density of surface acid chloride groups is relatively high [vide infra]. XPS analysis of these trifluoroacetylated GCNF/linker molecule materials strongly supports covalent surface attachment through amide condensation reactions and excludes other structural possibilities, such as linker molecule physisorption or intercalation.

Quantitative Characterization of GCNF Materials:

Derivation of approximate compositions for the GCNF materials prepared in this study has been attempted using a variety of quantitative analysis methods including bulk elemental analysis, acid and base uptake measurements, Fmoc analysis of amino groups, and TGA. TGA traces for as-prepared GCNFs, oxidized GCNFs, and for the seven GCNF/linker molecule materials reported herein are provided as Supplementary Data, although the interpretation of these TGA curves is complicated by over-lapping mass-loss events. Chemical compositions proposed for the GCNF materials reported in this study are only approximate and have been formulated under the following assumptions; (1) suggested compositions must be consistent with bulk elemental analysis data, (2) pH measurements are reliable for quantifying acidic and basic sites, (3) Fmoc analysis is reliable for the quantification of nucleophilic amino groups, and, (4) TGA mass-loss events provide only semi-quantitative information about composition.

As-prepared GCNFs have the empirical formula $C_{580}H_{21}O$, based on bulk elemental analysis (excluding residual metal growth catalyst). TGA reveals a total mass loss of 0.25 wt % from room temperature to 125° C., consistent with desorption of physisorbed water. Assuming that IR bands near 3000 cm$^{-1}$ can be assigned to C—H bond stretching vibrations, the proposed composition for as-prepared GCNFs is $C_{580}H_{19}(H_2O)$.

Oxidized GCNFs have an empirical formula of $C_{460}H_{32.5}NO_{50}$ based on bulk elemental analysis. Acid-uptake measurements indicated the presence of strong acid sites (6.92×10$^{-5}$ mol g$^{-1}$), while base-uptake data give a total acid site content of 5.20×10$^{-4}$ mol g$^{-1}$ and a calculated weak acid component of 4.51×10$^{-4}$ mol g$^{-1}$. Assuming that strong acid sites are various N—O—H species best represented compositionally as $HNO_3$, that the remaining N content is present as $NO_2$ groups, and that weak acid species can be represented as $CO_2H$, a composition of $C_{914}H_{58}O_{82}(NO_2)(HNO_3)(COOH)_6$ is suggested. Nitric acid intercalates into graphite and carbon nanotubes and might do likewise with GCNFs. TGA shows a 4 wt % total mass loss from room temperature to 100° C. that is assigned to loss of physisorbed water and $HNO_3$ giving a final suggested composition of $C_{914}H_{10}O_{58}(NO_2)(HNO_3)(COOH)_6(H_2O)_{24}$. Other O-containing species likely present in oxidized GCNFs include aldehyde, ketone, anhydride, or phenolic functional groups.

Approximate chemical compositions derived in similar fashion for the seven GCNF/linker molecule materials prepared in this study are provided in Table 2. Since amidation reactions are conducted under strongly basic and moderately reducing conditions (neat amine at elevated temperature), any $HNO_3$, nitrogen oxide or chemically equivalent functional groups present in the oxidized GCNFs will be removed or reduced. Acid uptake data is used to quantify the number density of proton basic sites, and Fmoc analysis data is used to quantify the number density of nucleophilic primary amino sites. Comparison of calculated chemical compositions based only on acid uptake and Fmoc analysis data with the chemical composition derived from bulk elemental analysis data gives estimates for the percentages of pendant, primary amino groups assumed to be present within the sample that are reactive to protonation or to electrophilic attack by Fmoc reagent. Due to the vast structural variety of local site environments probably present within GCNF materials, it is likely that some fraction of surface-bound linker molecules might have all available amino groups bound to the GCNF surface as amides or might have pendant, primary amino groups in local environments unsuitable for protonation by aqueous acid or for nucleohilic attack by Fmoc reagent.

derivatized with linker molecules. With a linker molecule surface density this high, a GCNF of 200 nm average diameter will have nearly one thousand linker molecules attached to each graphene layer. GCNF/linker molecule materials might be attractive as reactive strengthening additives for composite materials, because the structural features providing strengthening are individual graphene layers within the nanofiber and not GCNFs as a whole. IR Spectra, LDI mass spectra and TGA curves of as-prepared GCNFs and oxidized GCNFs, and of GCNF/HDA, GCNF/XDA, GCNF/PDA, GCNF/ODA, GCNF/TAPA, GCNF/TAB, and GCNF/TAPE materials are available free of charge via the Internet at http://www.sciencedirect.com.

Dried r-GCNF-ODA nanofibers were used as reinforcement additive for the formation of nanofiber/epoxy composite

TABLE 2

Quantitative Compositional Data for GCNF/Linker Molecule Materials

| GCNF/Linker Material | Composition By Bulk EA | Basic Sites$^a$ (mol/g) × $10^4$ | Fmoc-reactive Sites$^b$ (mol/g) × $10^4$ | Fraction of Basic$^c$ $NH_2$ (%) | Fraction of Fmoc-reactive$^d$ $NH_2$(%) |
|---|---|---|---|---|---|
| GCNF/HDA | $C_{80}H_5[C(O)HDA]$ | 8.2 | 1.7 | 98 | 20 |
| GCNF/XDA | $C_{42}H_{23}[C(O)XDA]$ | 12 | 1.4 | 84 | 10 |
| GCNF/PDA | $C_{43}H_3[C(O)PDA]$ | 1.4 | 0.89 | 10 | 6 |
| GCNF/ODA | $C_{82}H_4[C(O)ODA]$ | 0.43 | 0.55 | 6 | 7 |
| GCNF/TAPA | $C_{103}H_6[C(O)TAPA]$ | 2.2 | 0.45 | 18 | 4 |
| GCNF/TAB | $C_{106}H_4[C(O)TAB]$ | 1.8 | 0.66 | 16 | 6 |
| GCNF/TAPE | $C_{144}H_3[C(O)TAPE]$ | 0.80 | 0.65 | 10 | 8 |

$^a$Basic sites are calculated from base uptake measurements (average esd is 3.3%).
$^b$Fmoc-reactive sites are calculated from Fmoc analysis (average esd is 3.7%).
$^c$Fraction of basic sites is the ratio of experimental basic sites to the total amine groups expected from nitrogen elemental analysis. It is assumed there is one amine group for surface-bound diamine molecules and two for triamine molecules.
$^d$Fraction of Fmoc-reactive sites is the ratio of experimental Fmoc-reactive sites to the total amine groups expected from nitrogen elemental analysis.

Overall chemical compositions range from a relatively high incorporation of linker molecule for XDA and PDA (1 linker molecule for every ca. 40 GCNF carbon atoms) to relatively low incorporation for TAPE (1 TAPE linker molecule for every ca. 150 GCNF carbon atoms). The percentage of pendant, primary amino groups assumed to be present that can be protonated ranges from nearly 100% for the aliphatic diamines HDA and XDA to only 6% for the aromatic diamine ODA. Likewise, the percentage of pendant, primary amino groups assumed to react as nucleophiles with Fmoc ranges from 20% for HDA to only 4% for the triamine TAPA. Although rationalizing these different degrees of chemically reactivity is complicated by batch-to-batch variability of GCNF surface structure and degree of surface-site oxidation, these results provide useful comparisons of relative linker-molecule reactivity to aid in the selection of GCNF/linker molecular materials for future applications.

Quantification of the surface density of linker molecule binding is complicated by not knowing the precise surface structure of herringbone GCNFs. Surface areas measured for as-prepared herringbone GCNFs (107 m$^2$/g) and oxidized GCNFs (138 m$^2$/g) show an increase in nanofiber surface area due to oxidative etching of metal growth catalyst particles and the removal of amorphous carbon present within as-prepared GCNFs. From the compositional data shown in Table 2, the average linker molecule content of these seven GCNF/linker molecule materials is one linker molecule/86 GCNF carbon atoms. Knowing the surface area of oxidized GCNFs, the calculated average surface coverage per linker molecules is 0.24 nm$^2$. Relative to an edge-site atom surface coverage in graphite of ca. 0.08 nm$^2$ per carbon atom, approximately one-third of the available GCNF edge sites are apparently monoliths. Nanocomposite specimens having fiber loadings of 0.3 wt % and 1.3 wt % were prepared. The bending test results, shown in FIG. 8 (bar A and D, cured at the same heating cycle), indicate that adding dried rGCNF-ODA nanofibers to the epoxy resin reduces the flexural strength of the resulting composites compared to that of pure epoxy resin (bar G). Furthermore, composite specimens with fiber loading of 1.3 wt % exhibit lower strength than those composites prepared with 0.3 wt % fiber loading. A SEM micrograph of the fracture surface of a test specimen (see FIG. 9) reveals obvious agglomeration of nanofiber additive. Nanofiber agglomeration probably results from attractive interactions between polar functional groups present on the surfaces of adjacent r-GCNF-ODA nanofibers during the drying process.

However, addition of a fiber blend, consisting of r-GCNF-ODA nanofibers dispersed in diluent, to the epoxy resin prior to curing apparently minimizes nanofiber agglomeration, as indicated by the high dispersion of nanofibers at the fracture surface region of these monoliths (see the SEM image shown in FIG. 10). Control experiments indicate that the presence of small amounts of added diluent does not significantly reduce the flexural properties of these materials. The flexural strength of a nanocomposite prepared using a diluent blend and a nanofiber loading of 0.3 wt % fiber (FIG. 8, bar B) is 26% higher than that of a composite prepared using pre-dried nanofibers as an additive added (FIG. 8, bar A). When nanocomposite specimens prepared using a nanofiber/diluent blend and a fiber loading of 0.3 wt % are cured at 120° C. for 1 h, 160° C. for 2 h, and then 170° C. for 1 h, the flexural strength is increased even further (FIG. 8, bar C). For composite specimens prepared at 1.3 wt % nanofiber loading, additional curing time leads to higher flexural strength (FIG.

8, bars E and F) indicating that composites prepared with r-GCNF-ODA nanofibers at higher loadings need additional curing time. Most importantly, r-GCNF-ODA/epoxy nanocomposites prepared at nanofiber loadings of either 0.3 wt % or 1.3 wt % with sufficient thermal curing give composite materials exhibiting flexural strengths significantly greater than that of the pure epoxy resin (FIG. 8, cf. bars C and F with G).

Throughout this application, various publications are referenced. The disclosures of these publications in their entireties are hereby incorporated by reference into this application in order to more fully describe the state of the art to which this invention pertained.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims. The entire contents and disclosures of each and every literature and patent reference cited herein are incorporated herein by reference.

What is claimed is:

1. A composite comprising at least one graphite-carbon nanofiber (GCNF) and an epoxy thermoset phase covalently linked to a surface of said at least one GCNF, wherein said at least one GCNF surface is covalently linked to said epoxy thermoset phase by at least one linker molecule having a direct covalent amide bond with a surface carbon of the surface of said at least one GCNF and a covalent bond with an epoxy aoligomer portion of said epoxy thermoset phase,
   wherein said linker molecule is selected from the group consisting of aliphatic diamines, aromatic diamines and aromatic triamines.

2. The composite of claim 1 wherein said linker molecule is an aliphatic diamine selected from the group consisting of 1,6-hexamethylenediamine (HDA) and p-xylylenediamine (XDA).

3. The composite of claim 1 wherein the surface of said at least one GCNF has been functionalized to enhance the covalent bond with said linker molecule.

4. The composite of claim 3 wherein said GCNF surface has been functionalized by oxidation to form carboxyl groups thereon.

5. The composite of claim 4 wherein said oxidation is effected by contact of said GCNF surface with a strong acid.

6. The composite of claim 4 wherein said functionalized GCNF surface is activated by converting said carboxyl groups to active acyl groups.

7. The composite of claim 6 wherein said carboxyl groups are converted to acyl halide groups.

8. The composite of claim 6 wherein said carboxyl groups are converted to acyl chloride groups.

9. The composite of claim 1, wherein the linker molecule has a length of at least approximately 5 ANG.

10. The composite of claim 1, wherein said linker molecule has a steric rigidity sufficient to substantially prevent the functional substituent that reacts with the component of said polymer phase from reacting with said surface of said functionalized GCNF.

11. The composite of claim 1, wherein said linker molecule is an aromatic diamine is selected from the group consisting of aromatic diamines, 1,4-phenylenediamine (PDA) and 3,4'-oxydianiline (ODA).

12. The composite of claim 1 having a GCNF/polymer density of at least about 1 polymer linkage to said at least one GCNF per about 10 GCNF surface carbon atoms.

13. The composite of claim 1, wherein the GCNF is present in the composite at from about 0.1 to about 5%, by weight, of the composite.

14. The composite of claim 1, wherein the polymer composite exhibits an improvement in flexural strength of at least about 10% as compared to the flexural strength of the neat polymer phase.

15. The composite of claim 1, wherein said GCNF has a herringbone-type structure.

16. The composite of claim 1 wherein said linker molecule is an aromatic triamine selected from the group consisting of tris(4-aminophenylene)amine (TAPA); 1,3,5-tris(4-aminophenoxy)benzene (TAB) and tris[4-(4-aminophenoxy)phenyl]ethane (TAPE).

17. A composite comprising at least one graphite-carbon nanofiber (GCNF) and a cross-linked or cured epoxy thermoset phase covalently linked to a surface of said at least one GCNF, said epoxy thermoset phase comprising polymerized or copolymerized epoxy oligomers, wherein said at least one GCNF surface is covalently linked to said epoxy thermoset phase by at least one linker molecule having a direct covalent amide bond with a surface carbon of the surface of said at least one GCNF and a covalent bond with said epoxy thermoset phase,
   wherein said linker molecule is selected from the group consisting of aliphatic diamines, aromatic diamines and aromatic triamines.

18. The composite of claim 17, wherein said linker molecule is an aliphatic diamine selected from the group consisting of 1,6-hexamethylenediamine (HDA) and p-xylylenediamine (XDA).

19. The composite of claim 17, wherein said linker molecule is an aromatic diamine is selected from the group consisting of 1,4-phenylenediamine (PDA) and 3,4'-oxydianiline (ODA).

20. The composite of claim 17, wherein said an aromatic triamine selected from the group consisting of tris(4-aminophenylene)amine (TAPA); 1,3,5-tris(4-aminophenoxy)benzene (TAB) and tris[4-(4-aminophenoxy)phenyl]ethane (TAPE).

21. An article of manufacture formed from the composite of claim 17.

* * * * *